United States Patent
Machii

(10) Patent No.: US 12,450,737 B2
(45) Date of Patent: Oct. 21, 2025

(54) LEARNING DEVICE, IMAGE GENERATION DEVICE, LEARNING METHOD, IMAGE GENERATION METHOD, LEARNING PROGRAM, AND IMAGE GENERATION PROGRAM

(71) Applicant: FUJIFILM CORPORATION, Tokyo (JP)

(72) Inventor: Yusuke Machii, Kanagawa (JP)

(73) Assignee: FUJIFILM CORPORATION, Tokyo. (JP)

( * ) Notice: Subject to any disclaimer, the term of this patent is extended or adjusted under 35 U.S.C. 154(b) by 635 days.

(21) Appl. No.: 17/929,313

(22) Filed: Sep. 2, 2022

(65) Prior Publication Data

US 2023/0094397 A1    Mar. 30, 2023

(30) Foreign Application Priority Data

Sep. 30, 2021    (JP) .................................. 2021-162031

(51) Int. Cl.
    *G06K 9/00*    (2022.01)
    *A61B 6/02*    (2006.01)
    (Continued)

(52) U.S. Cl.
    CPC ............ *G06T 7/0012* (2013.01); *A61B 6/025* (2013.01); *G06V 10/25* (2022.01);
    (Continued)

(58) Field of Classification Search
    CPC ....... A61B 6/025; A61B 6/502; A61B 6/5223; G06T 2207/10072; G06T 2207/20081;
    (Continued)

(56) References Cited

U.S. PATENT DOCUMENTS

2006/0177125 A1 *  8/2006  Chan .................... G06T 7/44
    382/128
2019/0365341 A1 * 12/2019  Chan .................... G06N 3/08
(Continued)

FOREIGN PATENT DOCUMENTS

JP    2002-8009 A    1/2002
JP    2020-96752 A    6/2020
(Continued)

OTHER PUBLICATIONS

Bai, Jun et al., "Applying deep learning in digital breast tomosynthesis for automatic breast cancer detection: A review", Medical Image Analysis, Apr. 3, 2021, vol. 71, p. 102049, Elsevier, DOI: 10.1016/j.media.2021.102049.

(Continued)

*Primary Examiner* — Avinash Yentrapati
(74) *Attorney, Agent, or Firm* — SOLARIS Intellectual

(57) ABSTRACT

A learning device detects a first region of interest including a calcification and a second region of interest including another lesion on the basis of any one of a composite two-dimensional image obtained from a plurality of projection images captured by tomosynthesis imaging or a plurality of tomographic images, the tomographic image, or a normal two-dimensional image, and trains an image generation model, in which a weight for the first region of interest is largest and a weight for the second region of interest is set to be equal to or larger than a weight for a region other than the first region of interest and the second region of interest, by updating a weight for a network of the image generation model on the basis of a loss between a pseudo two-dimensional image output by the image generation model and the normal two-dimensional image and/or the composite two-dimensional image to reduce the loss.

9 Claims, 19 Drawing Sheets

(51) Int. Cl.
*G06T 7/00* (2017.01)
*G06V 10/25* (2022.01)

(52) U.S. Cl.
CPC .............. *G06T 2207/10072* (2013.01); *G06T 2207/20081* (2013.01); *G06T 2207/30068* (2013.01)

(58) Field of Classification Search
CPC . G06T 2207/20084; G06T 2207/30068; G06T 2207/30096; G06T 7/0012; G06V 10/25; G06V 10/82; G06V 2201/03
See application file for complete search history.

(56) References Cited

U.S. PATENT DOCUMENTS

| | | | | |
|---|---|---|---|---|
| 2020/0163638 | A1* | 5/2020 | Wicklein | G06T 11/008 |
| 2020/0285902 | A1* | 9/2020 | Kobayashi | G06V 10/764 |
| 2021/0192772 | A1* | 6/2021 | Tate | G06V 40/10 |
| 2021/0383534 | A1* | 12/2021 | Tadross | G06V 10/454 |
| 2023/0110904 | A1* | 4/2023 | Wu | G06T 7/0012 378/37 |

FOREIGN PATENT DOCUMENTS

| | | |
|---|---|---|
| JP | 2020-141867 A | 9/2020 |
| WO | 2021/133954 A1 | 7/2021 |
| WO | 2021/155123 A1 | 8/2021 |

OTHER PUBLICATIONS

English language translation of the following: Office action dated Feb. 4, 2025 from the JPO in a Japanese patent application No. 2021-162031 corresponding to the instant patent application. This office action translation is submitted now in order to supplement the understanding of the cited references which are being disclosed in the instant Information Disclosure Statement.

* cited by examiner

LEARNING DEVICE, IMAGE GENERATION DEVICE, LEARNING METHOD, IMAGE GENERATION METHOD, LEARNING PROGRAM, AND IMAGE GENERATION PROGRAM

CROSS-REFERENCE TO RELATED APPLICATIONS

The present application claims priority under 35 U.S.C. § 119 to Japanese Patent Application No. 2021-162031 filed on Sep. 30, 2021. The above application is hereby expressly incorporated by reference, in its entirety, into the present application.

BACKGROUND

1. Technical Field

The present disclosure relates to a learning device, an image generation device, a learning method, an image generation method, a learning program, and an image generation program.

2. Description of the Related Art

A technique is known which combines a series of a plurality of projection images obtained by tomosynthesis imaging, which is performed by irradiating a breast with radiation, or a plurality of tomographic images generated from the series of the plurality of projection images to generate a radiographic image corresponding to a normal two-dimensional image obtained by normal imaging. For example, JP2020-141867A discloses a technique that generates a pseudo two-dimensional image from projection images acquired by tomosynthesis imaging, using a trained model.

SUMMARY

In the technique disclosed in JP2020-141867A, in some cases, the reproducibility of a fine shape of a lesion, such as a calcification, is not sufficient for a normal two-dimensional image. Therefore, there is a demand for a technique that generates a pseudo two-dimensional image in which the fine shape of a lesion, such as a calcification, has been accurately reproduced.

The present disclosure has been made in view of the above circumstances, and an object of the present disclosure is to provide a learning device, an image generation device, a learning method, an image generation method, a learning program, and an image generation program that can generate a pseudo two-dimensional image in which a shape of a lesion of a breast has been accurately reproduced.

In order to achieve the above object, according to a first aspect of the present disclosure, there is provided a learning device for an image generation model that generates a pseudo two-dimensional image from a series of a plurality of projection images obtained by performing tomosynthesis imaging on a breast or from a plurality of tomographic images obtained from the series of the plurality of projection images. The learning device comprises at least one processor. The processor acquires a normal two-dimensional image captured by irradiating the breast with radiation, detects a first region of interest including a calcification of the breast and a second region of interest including a lesion other than the calcification on the basis of any one of a composite two-dimensional image obtained by combining at least some of the series of the plurality of projection images or the plurality of tomographic images, the tomographic image, or the normal two-dimensional image, and trains the image generation model, in which a weight for the first region of interest is largest and a weight for the second region of interest is set to be equal to or larger than a weight for a region other than the first region of interest and the second region of interest, by updating a weight for a network of the image generation model on the basis of a loss between the pseudo two-dimensional image output by the image generation model and the normal two-dimensional image and/or the composite two-dimensional image to reduce the loss.

According to a second aspect of the present disclosure, in the learning device according to the first aspect, the processor may detect the first region of interest from the normal two-dimensional image or from the composite two-dimensional image and detect the second region of interest from the tomographic image.

According to a third aspect of the present disclosure, in the learning device according to the first aspect or the second aspect, the processor may make the weight for the network to be updated different depending on a type of the other lesion.

According to a fourth aspect of the present disclosure, in the learning device according to any one of the first to third aspects, the processor may derive a mammary gland volume of the breast from the normal two-dimensional image and adjust at least one of the weight for the first region of interest, the weight for the second region of interest, or a weight for a third region of interest according to the derived mammary gland volume.

According to a fifth aspect of the present disclosure, in the learning device according to any one of the first to fourth aspects, the processor may correct a positional deviation between the series of the plurality of projection images or the plurality of tomographic images and the normal two-dimensional image and input the corrected series of the plurality of projection images or the corrected plurality of tomographic images to the image generation model to train the image generation model.

Further, in order to achieve the above object, according to a sixth aspect of the present disclosure, there is provided an image generation device that generates a pseudo two-dimensional image using an image generation model trained by the learning device according to the present disclosure. The image generation device comprises at least one processor. The processor acquires a series of a plurality of projection images obtained by performing tomosynthesis imaging on a breast or a plurality of tomographic images obtained from the series of the plurality of projection images as images for generating the pseudo two-dimensional image, combines at least some of the images for generating the pseudo two-dimensional image to generate a composite two-dimensional image, detects a region of interest including a lesion from the images for generating the pseudo two-dimensional image or from the composite two-dimensional image, inputs an image of the region of interest to the image generation model, acquires a pseudo two-dimensional image of the region of interest output from the image generation model, and combines the composite two-dimensional image and the pseudo two-dimensional image of the region of interest to generate a pseudo two-dimensional image.

Furthermore, in order to achieve the above object, according to a seventh aspect of the present disclosure, there is provided a learning method that is executed by a computer and that is for an image generation model that generates a pseudo two-dimensional image from a series of a plurality of projection images obtained by performing tomosynthesis imaging on a breast or from a plurality of tomographic images obtained from the series of the plurality of projection images. The learning method comprises: acquiring a normal two-dimensional image captured by irradiating the breast with radiation; detecting a first region of interest including a calcification of the breast and a second region of interest including a lesion other than the calcification on the basis of any one of a composite two-dimensional image obtained by combining at least some of the series of the plurality of projection images or the plurality of tomographic images, the tomographic image, or the normal two-dimensional image; and training the image generation model, in which a weight for the first region of interest is largest and a weight for the second region of interest is set to be equal to or larger than a weight for a region other than the first region of interest and the second region of interest, by updating a weight for a network of the image generation model on the basis of a loss between the pseudo two-dimensional image output by the image generation model and the normal two-dimensional image and/or the composite two-dimensional image to reduce the loss.

Moreover, in order to achieve the above object, according to an eighth aspect of the present disclosure, there is provided an image generation method that is executed by a computer and that generates a pseudo two-dimensional image using an image generation model trained by the learning device according to the present disclosure. The image generation method comprises: acquiring a series of a plurality of projection images obtained by performing tomosynthesis imaging on a breast or a plurality of tomographic images obtained from the series of the plurality of projection images as images for generating the pseudo two-dimensional image; combining at least some of the images for generating the pseudo two-dimensional image to generate a composite two-dimensional image; detecting a region of interest including a lesion from the images for generating the pseudo two-dimensional image or from the composite two-dimensional image; inputting an image of the region of interest to the image generation model and acquiring a pseudo two-dimensional image of the region of interest output from the image generation model; and combining the composite two-dimensional image and the pseudo two-dimensional image of the region of interest to generate a pseudo two-dimensional image.

In addition, in order to achieve the above object, according to a ninth aspect of the present disclosure, there is provided a learning program that causes a computer to execute a process of training an image generation model that generates a pseudo two-dimensional image from a series of a plurality of projection images obtained by performing tomosynthesis imaging on a breast or from a plurality of tomographic images obtained from the series of the plurality of projection images. The learning program causes the computer to execute a process comprising: acquiring a normal two-dimensional image captured by irradiating the breast with radiation; detecting a first region of interest including a calcification of the breast and a second region of interest including a lesion other than the calcification on the basis of any one of a composite two-dimensional image obtained by combining at least some of the series of the plurality of projection images or the plurality of tomographic images, the tomographic image, or the normal two-dimensional image; and training the image generation model, in which a weight for the first region of interest is largest and a weight for the second region of interest is set to be equal to or larger than a weight for a region other than the first region of interest and the second region of interest, by updating a weight for a network of the image generation model on the basis of a loss between the pseudo two-dimensional image output by the image generation model and the normal two-dimensional image and/or the composite two-dimensional image to reduce the loss.

Further, in order to achieve the above object, according to a tenth aspect of the present disclosure, there is provided an image generation program that causes a computer to execute a process of generating a pseudo two-dimensional image using an image generation model trained by the learning device according to the present disclosure. The image generation program causes the computer to execute a process comprising: acquiring a series of a plurality of projection images obtained by performing tomosynthesis imaging on a breast or a plurality of tomographic images obtained from the series of the plurality of projection images as images for generating the pseudo two-dimensional image; combining at least some of the images for generating the pseudo two-dimensional image to generate a composite two-dimensional image; detecting a region of interest including a lesion from the images for generating the pseudo two-dimensional image or from the composite two-dimensional image; inputting an image of the region of interest to the image generation model and acquiring a pseudo two-dimensional image of the region of interest output from the image generation model; and combining the composite two-dimensional image and the pseudo two-dimensional image of the region of interest to generate a pseudo two-dimensional image.

According to the present disclosure, it is possible to generate a pseudo two-dimensional image in which the shape of a lesion of a breast has been accurately reproduced.

BRIEF DESCRIPTION OF THE DRAWINGS

Exemplary embodiments according to the technique of the present disclosure will be described in detail based on the following figures, wherein.

DETAILED DESCRIPTION

Hereinafter, an embodiment of the present disclosure will be described in detail with reference to the drawings. In addition, this embodiment does not limit the present disclosure.

Figure 1:
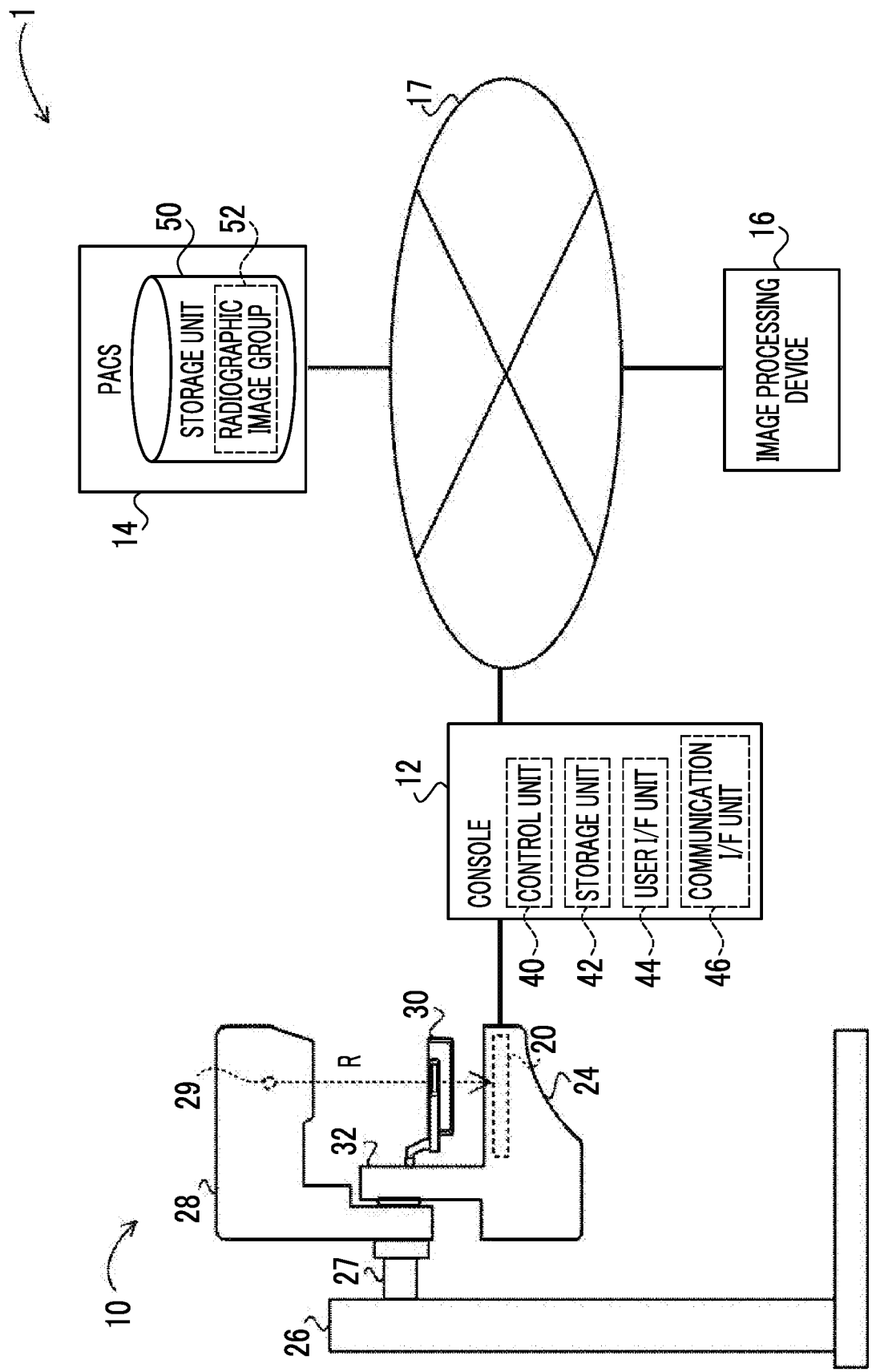
FIG. 1 is a diagram schematically illustrating an example of an overall configuration of a radiography system according to an embodiment.

First, an example of an overall configuration of a radiography system according to this embodiment will be described. FIG. 1 is a diagram illustrating an example of the overall configuration of a radiography system 1 according to this embodiment. As illustrated in FIG. 1, the radiography system 1 according to this embodiment comprises a mammography apparatus 10, a console 12, a picture archiving and communication system (PACS) 14, and an image processing device 16. The console 12, the PACS 14, and the image processing device 16 are connected by wired communication or wireless communication through a network 17.

First, the mammography apparatus 10 according to this embodiment will be described. FIG. 1 is a side view illustrating an example of the outward appearance of the mammography apparatus 10 according to this embodiment. In addition, FIG. 1 illustrates an example of the outward appearance of the mammography apparatus 10 as viewed from a left side of a subject.

The mammography apparatus 10 according to this embodiment is an apparatus that is operated under the control of the console 12 and that irradiates a breast of a subject as an object with radiation R (for example, X-rays) emitted from a radiation source 29 to capture a radiographic image of the breast. Further, the mammography apparatus 10 according to this embodiment has a function of performing normal imaging that captures images at an irradiation position where the radiation source 29 is disposed along a normal direction to a detection surface 20A of a radiation detector 20 and so-called tomosynthesis imaging (will be described in detail below) that captures images while moving the radiation source 29 to each of a plurality of irradiation positions.

As illustrated in FIG. 1, the mammography apparatus 10 comprises an imaging table 24, a base 26, an arm portion 28, and a compression unit 32.

Figure 2:
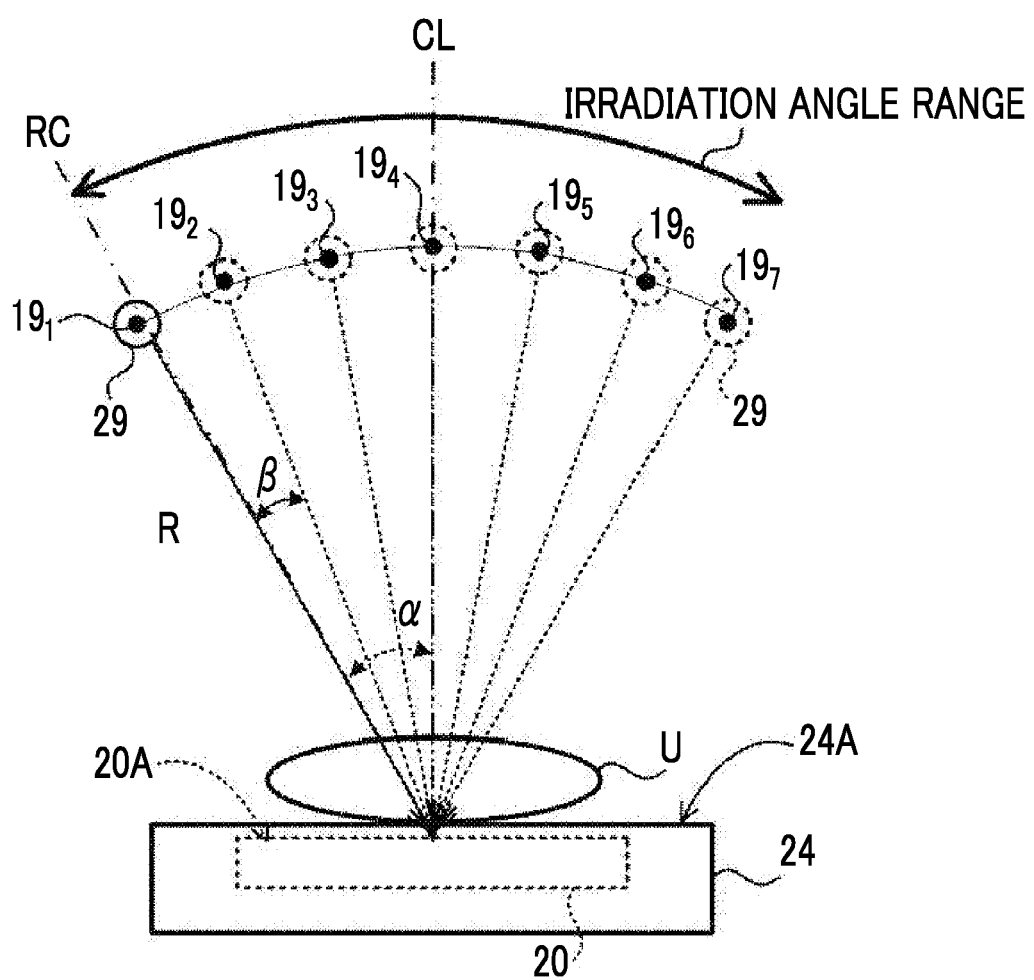
FIG. 2 is a diagram illustrating an example of tomosynthesis imaging.

The radiation detector 20 is provided in the imaging table 24. As illustrated in FIG. 2, in the mammography apparatus 10 according to this embodiment, in a case in which imaging is performed, a breast U of the subject is positioned on an imaging surface 24A of the imaging table 24 by a user.

The radiation detector 20 detects the radiation R transmitted through the breast U which is the object. Specifically, the radiation detector 20 detects the radiation R that has entered the breast U of the subject and the imaging table 24 and that has reached the detection surface 20A of the radiation detector 20, generates a radiographic image on the basis of the detected radiation R, and outputs image data indicating the generated radiographic image. In the following description, in some cases, a series of operations of emitting the radiation R from the radiation source 29 and generating a radiographic image using the radiation detector 20 is referred to as "imaging". The type of the radiation detector 20 according to this embodiment is not particularly limited. For example, the radiation detector 20 may be an indirect-conversion-type radiation detector that converts the radiation R into light and converts the converted light into charge or may be a direct-conversion-type radiation detector that directly converts the radiation R into charge.

A compression plate 30 used for compressing the breast during imaging is attached to the compression unit 32 provided on the imaging table 24 and is moved in a direction (hereinafter, referred to as an "up-down direction") toward or away from the imaging table 24 by a compression plate driving unit (not illustrated) that is provided in the compression unit 32. The compression plate 30 is moved in the up-down direction to compress the breast of the subject between the imaging table 24 and the compression plate 30.

The arm portion 28 can be rotated with respect to the base 26 by a shaft portion 27. The shaft portion 27 is fixed to the base 26, and the shaft portion 27 and the arm portion 28 are rotated integrally. Gears are provided in each of the shaft portion 27 and the compression unit 32 of the imaging table 24. The gears can be switched between an engaged state and a non-engaged state to switch between a state in which the compression unit 32 of the imaging table 24 and the shaft portion 27 are connected and rotated integrally and a state in which the shaft portion 27 is separated from the imaging table 24 and runs idle. In addition, components for switching between the transmission and non-transmission of power of the shaft portion 27 are not limited to the gears, and various mechanical elements may be used. Each of the arm portion 28 and the imaging table 24 can be relatively rotated with respect to the base 26, using the shaft portion 27 as a rotation axis.

In a case in which the tomosynthesis imaging is performed in the mammography apparatus 10, the radiation source 29 is sequentially moved to each of a plurality of irradiation positions having different irradiation angles by the rotation of the arm portion 28. The radiation source 29 includes a radiation tube (not illustrated) that generates the radiation R, and the radiation tube is moved to each of the plurality of irradiation positions according to the movement of the radiation source 29. FIG. 2 is a diagram illustrating an example of the tomosynthesis imaging. In addition, the compression plate 30 is not illustrated in FIG. 2. In this embodiment, as illustrated in FIG. 2, the radiation source 29 is moved to irradiation positions $19t$ (t=1, 2, . . . ; the maximum value is 7 in FIG. 2) having different irradiation angles which are arranged at an interval of a predetermined angle $\beta$, that is, positions where the radiation R is emitted to the detection surface 20A of the radiation detector 20 at different angles. At each of the irradiation positions $19t$, the radiation source 29 emits the radiation R to the breast U in response to an instruction from the console 12, and the radiation detector 20 captures a radiographic image. In the radiography system 1, in a case in which the tomosynthesis imaging that moves the radiation source 29 to each of the irradiation positions $19t$ and captures radiographic images at each of the irradiation positions $19t$ is performed, seven radiographic images are obtained in the example illustrated in FIG. 2. In addition, in the following description, in the tomosynthesis imaging, in a case in which the radiographic image captured at each irradiation position 19 is distinguished from other radiographic images, it is referred to as a "projection image", and a plurality of projection images captured by one tomosynthesis imaging operation are referred to as "a series of a plurality of projection images". Further, in a case in which radiographic images, such as a projection image, a tomographic image which will be described below, and a normal two-dimensional image, are generically referred to regardless of the type, they are simply referred to as "radiographic images". Further, in the following description, for the image corresponding to the irradiation position $19t$, such as the projection image captured at each irradiation position $19t$, the reference letter "t" indicating the irradiation position $19t$ is given to the reference numeral indicating each image.

In addition, as illustrated in FIG. 2, the irradiation angle of the radiation R means an angle $\alpha$ formed between a normal line CL to the detection surface 20A of the radiation detector 20 and a radiation axis RC. The radiation axis RC means an axis that connects a focus of the radiation source 29 at each irradiation position 19 and a preset position such as a center of the detection surface 20A. Further, here, it is assumed that the detection surface 20A of the radiation detector 20 is substantially parallel to the imaging surface 24A.

Moreover, in a case in which the mammography apparatus 10 performs the normal imaging, the radiation source 29 remains at the irradiation position $19t$ (the irradiation position $19t$ along the normal direction; the irradiation position 194 in FIG. 2) where the irradiation angle $\alpha$ is 0 degrees. The radiation source 29 emits the radiation R in response to an instruction from the console 12, and the radiation detector 20 captures a radiographic image. In this embodiment, in a case in which a radiographic image captured in the normal imaging is distinguished from other radiographic images, it is referred to as a "normal two-dimensional image".

The mammography apparatus 10 and the console 12 are connected by wired communication or wireless communication. The radiographic image captured by the radiation detector 20 in the mammography apparatus 10 is output to the console 12 by wired communication or wireless communication through a communication interface (I/F) unit (not illustrated).

As illustrated in FIG. 1, the console 12 according to this embodiment comprises a control unit 40, a storage unit 42, a user I/F unit 44, and a communication I/F unit 46.

As described above, the control unit 40 of the console 12 has a function of controlling the capture of the radiographic image of the breast by the mammography apparatus 10. An example of the control unit 40 is a computer system comprising a central processing unit (CPU), a read only memory (ROM), and a random access memory (RAM).

The storage unit 42 has a function of storing, for example, information related to the acquisition of a radiographic image or the radiographic image acquired from the mammography apparatus 10. The storage unit 42 is a non-volatile storage unit and is, for example, a hard disk drive (HDD) or a solid state drive (SSD).

The user I/F unit 44 includes input devices, such as various buttons and switches operated by the user, such as a radiology technician, regarding the capture of a radiographic image, and display devices, such as lamps and displays, that display information related to imaging and radiographic images.

The communication I/F unit 46 transmits and receives various kinds of data, such as information related to the capture of radiographic images and the radiographic images, to and from the mammography apparatus 10 using wired communication or wireless communication. In addition, the communication I/F unit 46 transmits and receives various kinds of data, such as radiographic images, to and from the PACS 14 and the image processing device 16 through the network 17 using wired communication or wireless communication.

Further, as illustrated in FIG. 1, the PACS 14 according to this embodiment comprises a storage unit 50 that stores a radiographic image group 52 and a communication I/F unit (not illustrated). The radiographic image group 52 includes, for example, the radiographic image captured by the mammography apparatus 10 acquired from the console 12 through the communication I/F unit (not illustrated).

The image processing device 16 is used by a doctor or the like (hereinafter, simply referred to as a "doctor") to interpret a radiographic image. The image processing device 16 according to this embodiment has a function of generating a pseudo two-dimensional image corresponding to a normal two-dimensional image from a plurality of tomographic images using an image generation model. In addition, the image processing device 16 according to this embodiment is an example of a learning device according to the present disclosure.

Figure 3:
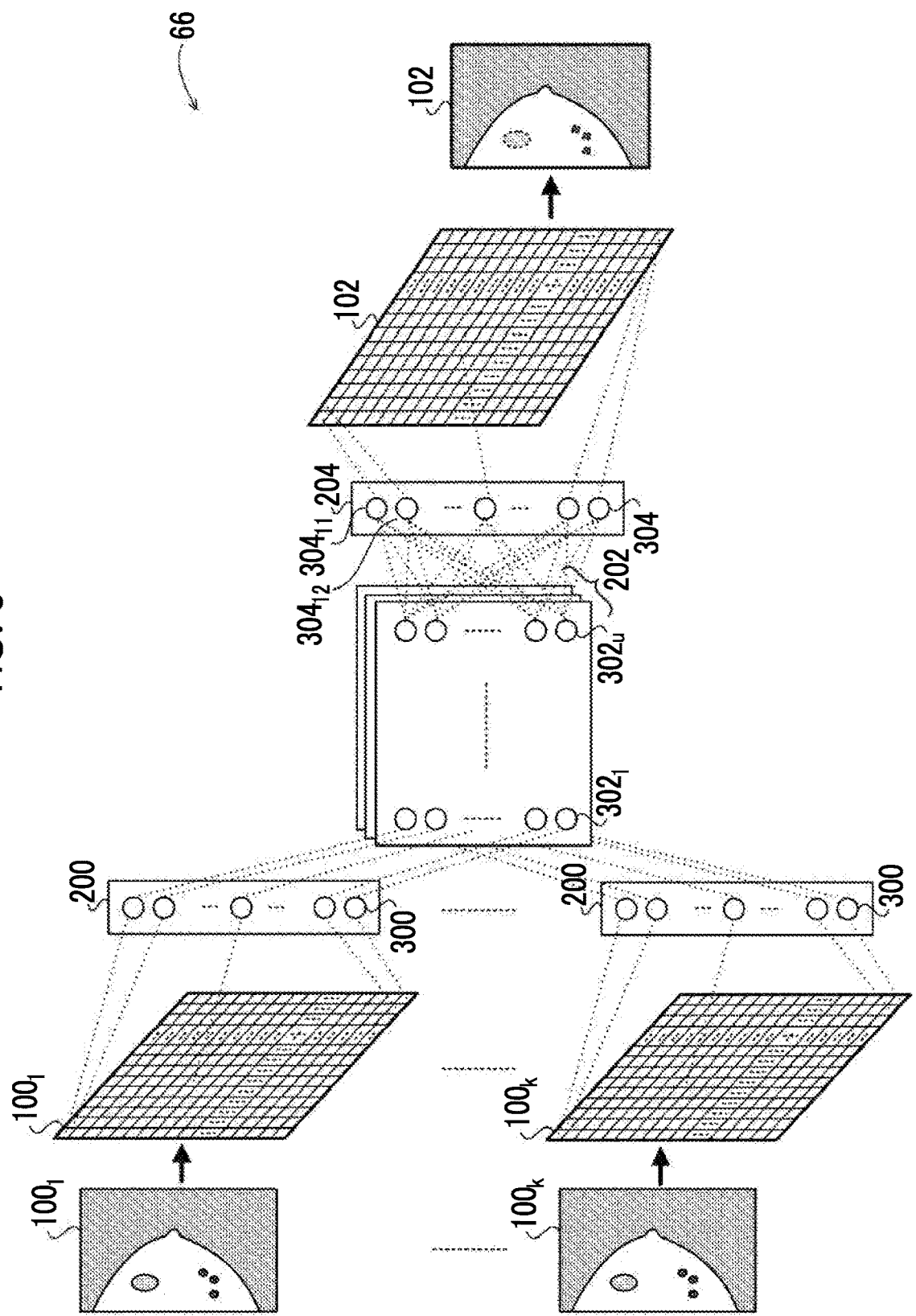
FIG. 3 is a diagram illustrating an example of an image generation model.

First, an example of the image generation model used to generate the pseudo two-dimensional image in the image processing device 16 according to this embodiment will be described. FIG. 3 illustrates an example of an image generation model 66 according to this embodiment. A convolutional neural network (CNN) that has been subjected to machine learning by deep learning is used as the image generation model 66 according to this embodiment. The image generation model 66 receives a plurality of tomographic images 100 (k tomographic images: tomographic images 100<sub>1</sub> to 100<sub>k</sub> in FIG. 3) obtained from a series of projection images as an input and outputs a pseudo two-dimensional image 102.

The image generation model 66 illustrated in FIG. 3 comprises input layers 200 which are provided for each of the k tomographic images 100, a middle layer 202, and an output layer 204. Further, in this embodiment, the input layers 200 provided for each tomographic image 100 have the same configuration.

The tomographic image 100 is input to the input layer 200. The input layer 200 includes a plurality of nodes 300, and each node 300 corresponds to each pixel of the tomographic image 100. The input layer 200 performs a convolution process in a case in which information of each pixel (every pixel) of the input tomographic image 100 is transmitted to the middle layer 202. For example, in a case in which the image to be processed has a size of 28 pixels×28 pixels and is grayscale data, the size of data transmitted from the input layer 200 to the middle layer 202 is 28×28×1=784.

In addition, the present disclosure is not limited to this embodiment, and information may be input to the input layer 200 in units of voxels cut out from a plurality of tomographic images 100.

Figure 4:
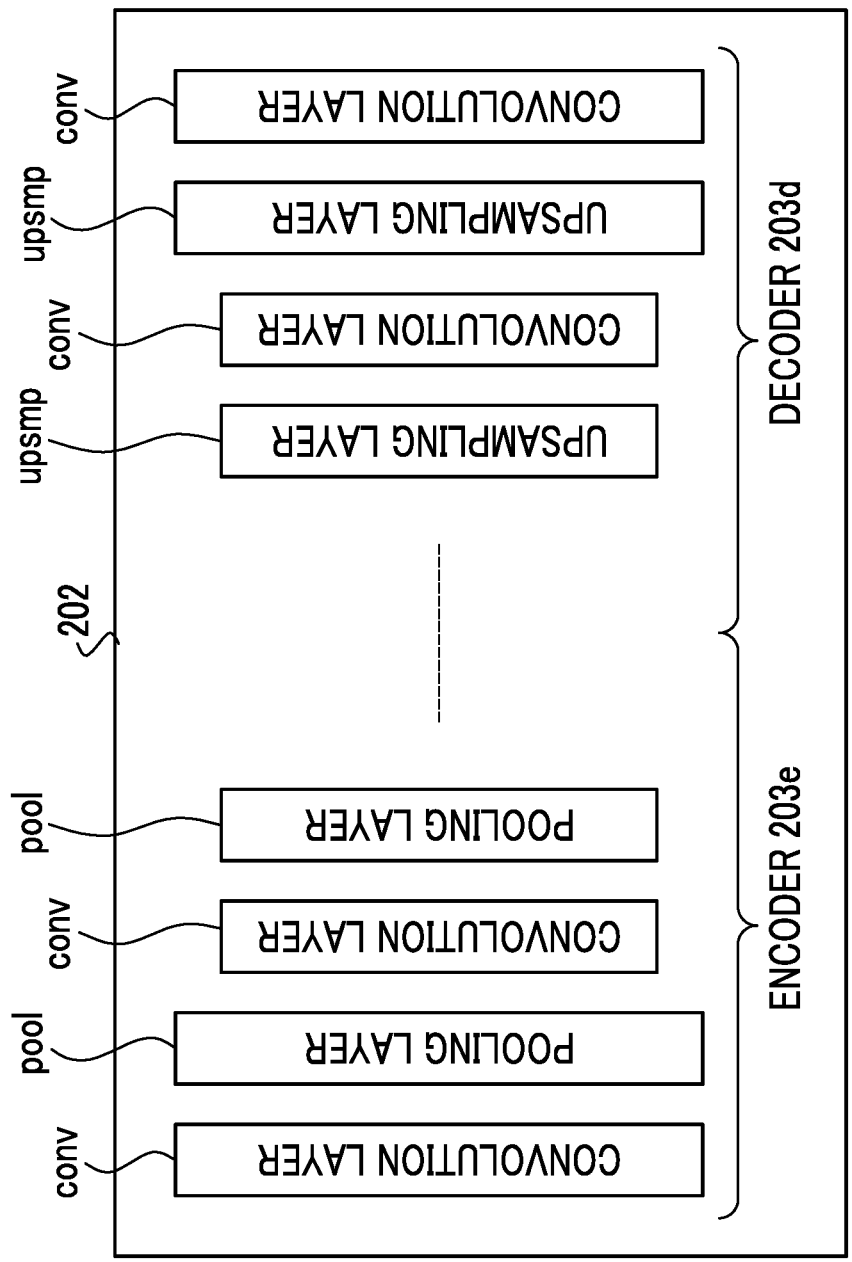
FIG. 4 is a diagram illustrating an example of a middle layer of the image generation model illustrated in FIG. 3.

As illustrated in FIG. 4, the middle layer 202 includes an encoder 203e and a decoder 203d. The encoder 203e includes a plurality of convolution layers cony that perform the convolution process and a plurality of pooling layers pool that perform a pooling process according to the number of layers of the encoder 203e (the number of layers illustrated in the encoder 203e in FIG. 4 is "2"). Further, a plurality of nodes 3021 illustrated in FIG. 3 correspond to a plurality of nodes that are included in the convolution layer cony in the first layer included in the encoder 203e.

In the convolution process, a three-dimensional convolution operation is performed on each pixel, and pixel values Icp(x, y, z) corresponding to each pixel of interest Ip are output. In this way, three-dimensional output data Dc including a plurality of output data DIc having the pixel values Icp(x, y, z) that are two-dimensionally arranged is output. One output data item Dc is output for one 3×3×3 filter F. In a case in which a plurality of filters F of different types are used, the output data Dc is output for each filter F. The filter F means a neuron (node) of the convolution layer, and features that can be extracted are determined for each filter F. Therefore, the number of features that can be extracted from one input data item D in the convolution layer is the number of filters F.

Further, in the pooling layer pool, a pooling process that reduces the original image while maintaining the features is performed. In other words, in the pooling layer pool, a pooling process that selects a local representative value and reduces the resolution of the input image to reduce the size of the image is performed. For example, in a case in which the pooling process of selecting a representative value from a block of 2×2 pixels is performed with a stride of "1", that is, by shifting the pixel one by one, a reduced image obtained by reducing the size of the input image by half is output.

Meanwhile, the decoder 203d includes a plurality of convolution layers cony that perform a convolution process and a plurality of upsampling layers upsmp that perform an upsampling process according to the number of layers in the decoder 203d (the number of layers illustrated in the decoder 203d in FIG. 4 is "2"). In addition, a plurality of nodes $302_u$ illustrated in FIG. 3 correspond to a plurality of nodes that are included in the convolution layer cony in the first layer included in the decoder 203d.

The convolution layer cony included in the decoder 203d performs the same process as the convolution layer cony included in the encoder 203e. Meanwhile, the upsampling layer upsmp receives the output of the encoder 203e as an input and performs a process to make the image size to be equal to the size of the pseudo two-dimensional image.

Meanwhile, the output layer 204 is a fully connected layer to which all of the nodes $302_u$ included in the convolution layer cony disposed at the end of the middle layer 202 are connected. An image size in the output layer 204 is the same as the size of the pseudo two-dimensional image 102 output from the image generation model 66, and a plurality of nodes 304 included in the output layer 204 correspond to each pixel of the pseudo two-dimensional image 102.

Therefore, in a case in which a plurality of tomographic images 100 are input, the image generation model 66 according to this embodiment outputs the pseudo two-dimensional image 102.

Figure 5:
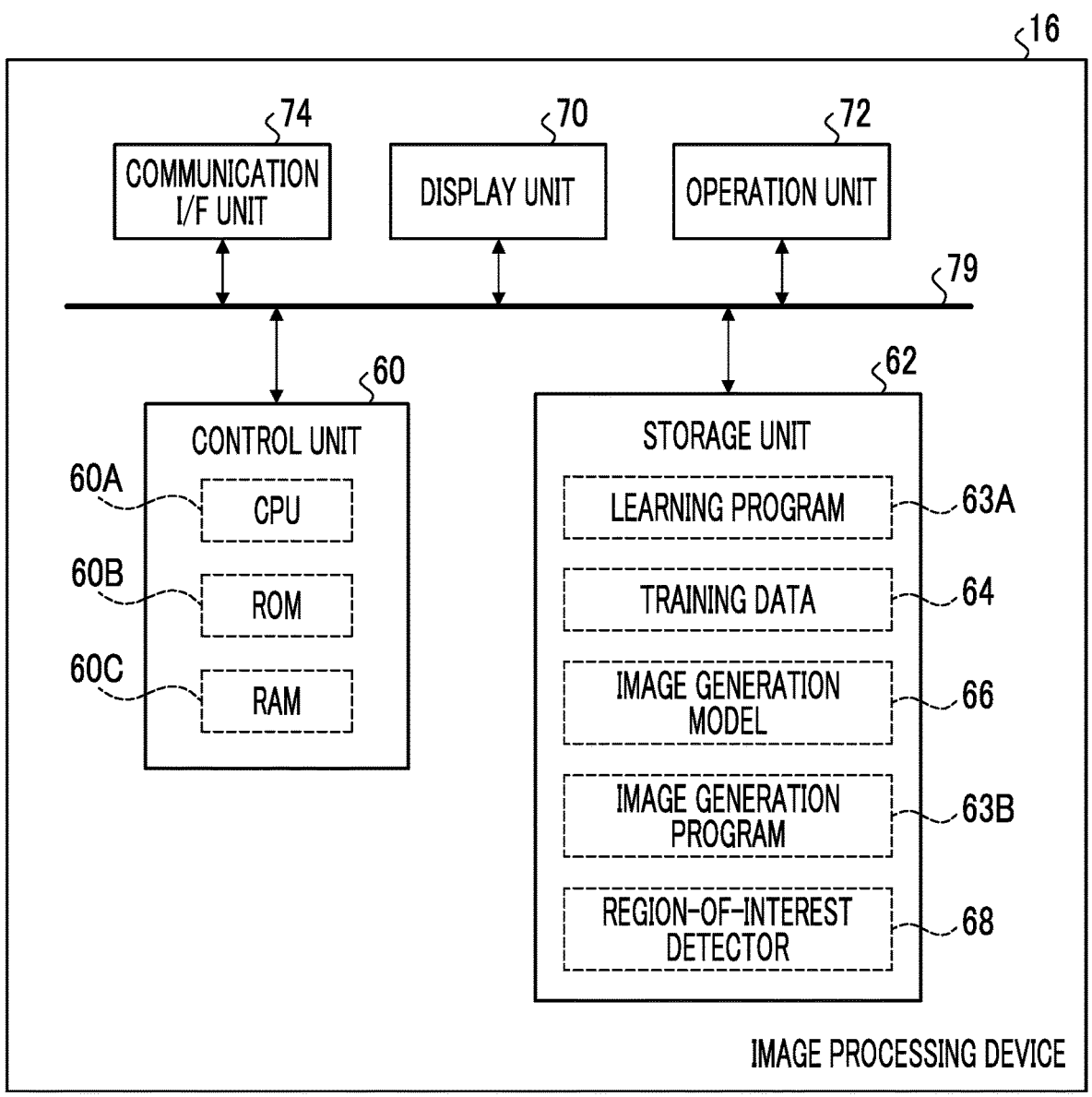
FIG. 5 is a block diagram illustrating an example of a configuration of an image processing device according to the embodiment.

FIG. 5 is a block diagram illustrating an example of the configuration of the image processing device 16 according to this embodiment. As illustrated in FIG. 5, the image processing device 16 according to this embodiment comprises a control unit 60, a storage unit 62, a display unit 70, an operation unit 72, and a communication I/F unit 74. The control unit 60, the storage unit 62, the display unit 70, the operation unit 72, and the communication I/F unit 74 are connected to each other through a bus 79, such as a system bus or a control bus, such that they can transmit and receive various kinds of information.

The control unit 60 controls the overall operation of the image processing device 16. The control unit 60 comprises a CPU 60A, a ROM 60B, and a RAM 60C. Various programs and the like used by the CPU 60A for control are stored in the ROM 60B in advance. The RAM 60C temporarily stores various kinds of data.

The storage unit 62 is a non-volatile storage unit and is, for example, an HDD or an SSD. The storage unit 62 stores various kinds of information such as a learning program 63A, an image generation program 63B, training data 64 for training the image generation model 66, the image generation model 66, and a region-of-interest detector 68 (which will be described in detail below).

The display unit 70 displays radiographic images or various kinds of information. The display unit 70 is not particularly limited, and various displays and the like may be used. In addition, the operation unit 72 is used by the user to input instructions for the diagnosis of the lesion of the breast using a radiographic image by a doctor, various kinds of information, or the like. The operation unit 72 is not particularly limited. Examples of the operation unit 72 include various switches, a touch panel, a touch pen, and a mouse. In addition, the display unit 70 and the operation unit 72 may be integrated into a touch panel display.

The communication I/F unit 74 transmits and receives various kinds of information to and from the console 12 and the PACS 14 through the network 17 using wireless communication or wired communication.

The functions of the image processing device 16 according to this embodiment will be described. There are a learning phase for training the image generation model 66 and an operation phase for generating a pseudo two-dimensional image from a plurality of tomographic images using the image generation model 66.

Learning Phase

Figure 6:
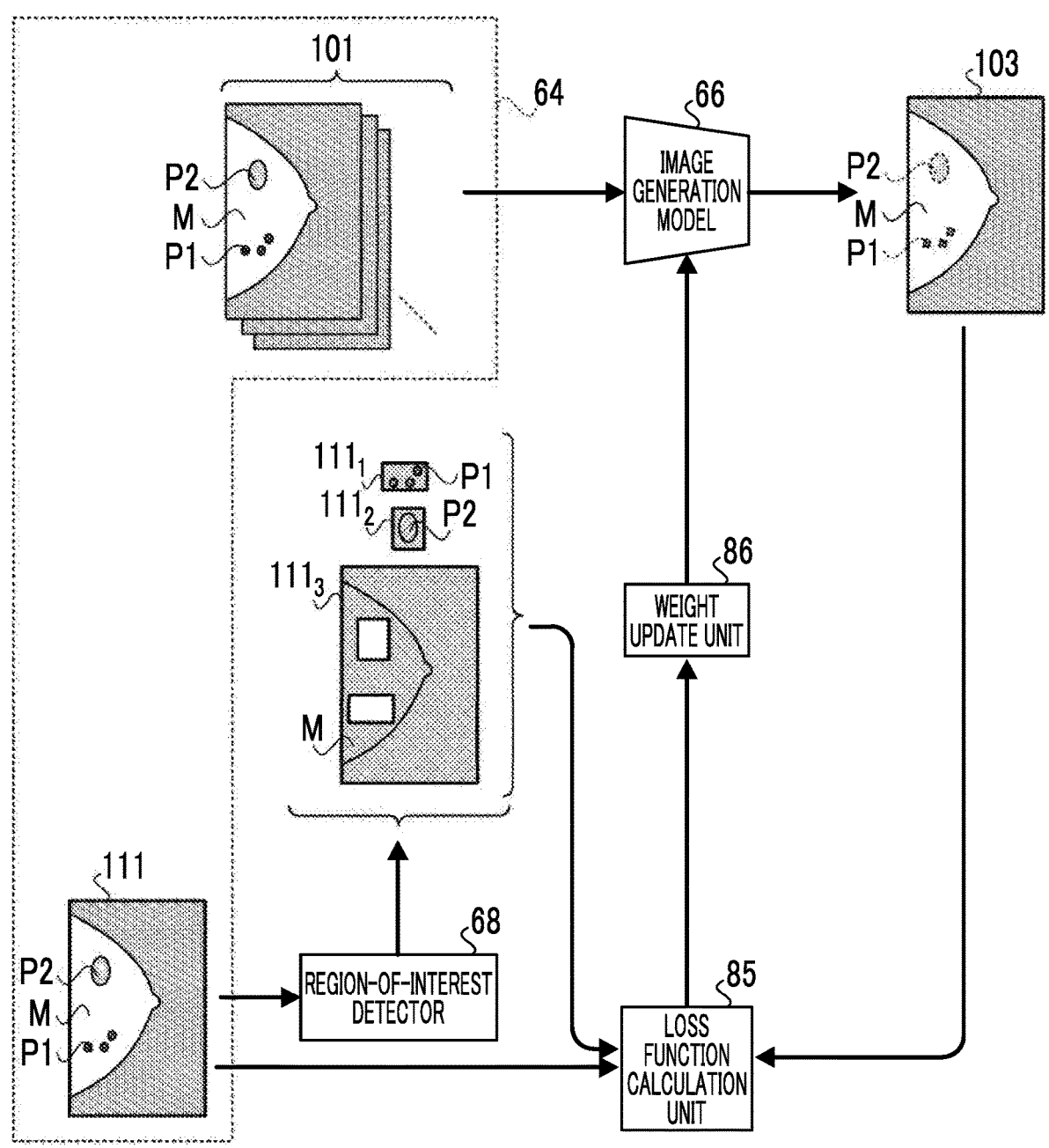
FIG. 6 is a schematic diagram illustrating an outline of a flow of the training of the image generation model in the image processing device according to the embodiment.

First, an example of the learning phase of the image processing device 16 according to this embodiment will be described. FIG. 6 is a schematic diagram illustrating the outline of the flow of the training of the image generation model 66 in the image processing device 16 according to this embodiment.

As illustrated in FIG. 6, the training data 64 includes a set of a normal two-dimensional image 111 obtained by performing the normal imaging on the breast and a plurality of tomographic images 101 obtained from a series of a plurality of projection images obtained by performing the tomosynthesis imaging on the same breast.

In the learning phase, the plurality of tomographic images of the training data 64 are input to the image generation model 66. As described above, the image generation model 66 outputs a pseudo two-dimensional image 103.

A loss function calculation unit 85 calculates a loss function which is a function indicating the degree of difference between the pseudo two-dimensional image 103 output from the image generation model 66 and the normal two-dimensional image 111. As the value of the loss function becomes closer to 0, the pseudo two-dimensional image 103 becomes more similar to the normal two-dimensional image 111, and the shape of a lesion in the pseudo two-dimensional image 103 is more accurately reproduced.

The loss function calculation unit 85 according to this embodiment calculates, as the loss function, an added value of values obtained by multiplying the differences between the pseudo two-dimensional image 103 and each of a first region of interest $111_1$ which is a region including a calcification P1 of the breast in the normal two-dimensional image 111, a second region of interest $111_2$ which is a region including an other lesion P2 other than the calcification P1, and an other region $111_3$ by weights corresponding to each region. Specifically, the loss function calculation unit 85 calculates the loss function on the basis of the following Expression (1).

Difference between pseudo two-dimensional image 103 and first region of interest $111_1$×weight $W111_1$+difference between pseudo two-dimensional image 103 and second region of interest $111_2$×weight $W111_2$+difference between pseudo two-dimensional image 103 and the other region $111_3$×weight $W111_2$      (1)

In the above-described Expression (1), the weight $W111_1$ is a weight for the first region of interest $111_1$ and is a weight corresponding to the calcification P1. The weight $W111_2$ is a weight for the second region of interest $111_2$ and is a weight corresponding to the other lesion P2. Further, the weight $W111_3$ is a weight for the other region $111_3$ and is a weight corresponding to other regions, for example, normal tissues.

In addition, in the image generation model 66 according to this embodiment, the weights for each region of interest are preset such that the weight $W111_1$ for the first region of interest $111_1$ is the largest and the weight $W111_2$ for the second region of interest $111_2$ is equal to or larger than the weight $W111_3$ for the other region $111_3$. In other words, the weights $W111_1$ to $W111_3$ in the image generation model 66 satisfy the relationship of the following Expression (2).

Weight $W111_1$>Weight $W111_2$≥Weight $W111_3$      (2)

Among the lesions, particularly, the calcification tends to be smaller than other lesions and has a finer shape. In addition, the shape of the calcification is an important finding in the diagnosis of lesions by the doctor. Therefore, as shown in the relationship of the above-described Expression (2), the image processing device 16 sets the weight Will1 for the first region of interest $111_1$ including the calcification P1 to be the largest to train the image generation model 66 with more focus on the calcification P1 than on other lesions or normal tissues.

Further, as shown in the relationship of the above-described Expression (2), the image processing device 16 trains the image generation model 66 while setting the weight $W111_2$ for the second region of interest $111_2$ including the other lesion P2 other than the calcification P1 to be equal to or larger than the weight $W111_3$ for the other region $111_3$, which makes it possible to suppress a reduction in the reproducibility of other lesions.

Therefore, the region-of-interest detector 68 detects the first region of interest $111_1$, the second region of interest $111_2$, and the other region $111_3$ from the normal two-dimensional image 111.

For example, in this embodiment, a detector using a known computer-aided diagnosis (CAD) algorithm is used as the region-of-interest detector 68. In the CAD algorithm, a probability (likelihood) indicating that a pixel of the normal two-dimensional image 111 will be the calcification P1 is derived, and a pixel having a probability equal to or greater than a predetermined threshold value is detected as the calcification P1. A region including the calcification P1 is detected as the first region of interest $111_1$. Similarly, a probability (likelihood) indicating that the pixel of the normal two-dimensional image 111 will be a lesion (hereinafter, referred to as "the other lesion"), such as a tumor P2, other than the calcification is derived, and a pixel having a probability equal to or greater than the predetermined threshold value is detected as the other lesion P2. A region including the other lesion P2 is detected as the second region of interest $111_2$. In addition, the region-of-interest detector 68 for detecting the calcification P1 and the region-of-interest detector 68 for detecting the other lesion P2 may be one detector or separate detectors. In other words, the CAD in the region-of-interest detector 68 may be a CAD for detecting the calcification P1 and the other lesion P2 or may be a combination of a CAD for detecting the calcification P1 and a CAD for detecting the other lesion P2.

In the example illustrated in FIG. 6, both the first region of interest $111_1$ and the second region of interest $111_2$ are rectangular regions that surround the calcification P1 and the other lesion P2, respectively, and, strictly speaking, also include breast tissues other than the calcification P1 and the other lesion P2. In addition, in this embodiment, the first region of interest $111_1$ and the second region of interest $111_2$ may be regions that include only the calcification P1 and the other lesion P2, respectively. Further, a region excluding the first region of interest $111_1$ and the second region of interest $111_2$ from the normal two-dimensional image 111 is specified as the other region $111_3$. Hereinafter, in a case in which the first region of interest $111_1$ and the second region of interest $111_2$ are collectively referred to, they are simply referred to as "regions of interest".

For example, the relationship of the above-described Expression (2) may be satisfied for weights for all of the pixels included in each of the first region of interest $111_1$, the second region of interest $111_2$, and the other region $111_3$. Further, for example, the relationship of the above-described Expression (2) may be satisfied for the average value of the weights for the pixels included in the first region of interest $111_1$, the average value of the weights for the pixels included in the second region of interest $111_2$, and the average value of the weights for the pixels included in the other region $111_3$.

A weight update unit 86 updates a weight for the network of the image generation model 66 according to the loss function calculated by the loss function calculation unit 85.

Specifically, the weight update unit 86 changes a weight indicating the strength of the connection between nodes in the previous and next layers which are coefficients of each filter F in the image generation model 66 and a weight w for a difference in connection between the nodes 304 of the output layer 204 and nodes 310 of a connection layer 210 in each tomographic image 101 according to the loss function calculated by the loss function calculation unit 85, using a back propagation method, a stochastic gradient descent method, or the like.

In the learning phase, a series of processes of the input of the plurality of tomographic images 101 of the training data 64 to the image generation model 66, the output of the pseudo two-dimensional image 103 from the image generation model 66, the calculation of the loss function, the detection of the region of interest, and the update of the weight using the above-described Expression (2) is repeatedly performed so as to reduce the loss function.

Figure 7:
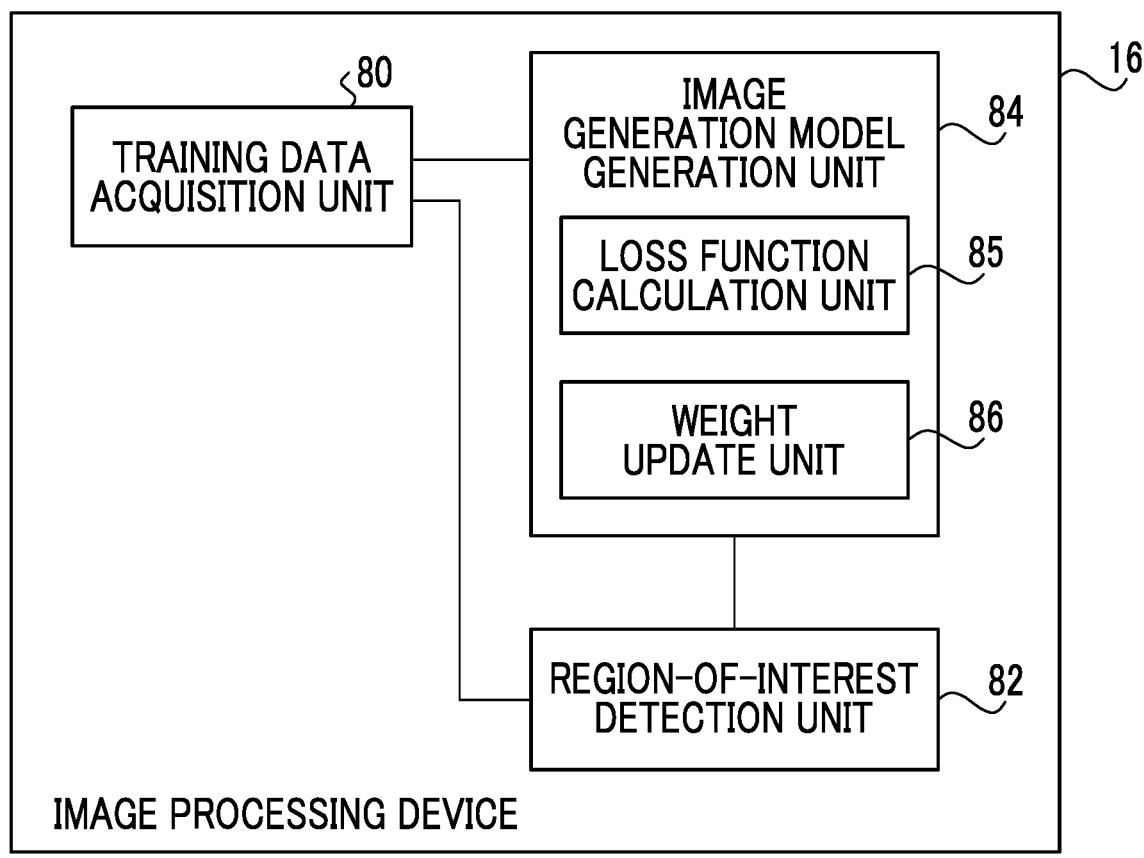
FIG. 7 is a functional block diagram illustrating an example of a configuration related to a function of generating the image generation model in the image processing device according to the embodiment.

FIG. 7 is a functional block diagram illustrating an example of a configuration related to a function of generating the image generation model 66 in the image processing device 16 according to this embodiment. As illustrated in FIG. 7, the image processing device 16 comprises a training data acquisition unit 80, a region-of-interest detection unit 82, and an image generation model generation unit 84. For example, in the image processing device 16 according to this embodiment, the CPU 60A of the control unit 60 executes the learning program 63A stored in the storage unit 62 to function as the training data acquisition unit 80, the region-of-interest detection unit 82, and the image generation model generation unit 84.

The training data acquisition unit 80 has a function of acquiring the training data 64 from the storage unit 62. In addition, one training data item 64 is illustrated in FIG. 6. However, in practice, the storage unit 62 stores a sufficient amount of training data 64 to train the image generation model 66. The training data acquisition unit 80 outputs the acquired training data 64 to the region-of-interest detection unit 82 and to the image generation model generation unit 84.

As described above, the region-of-interest detection unit 82 detects the first region of interest 111$_1$, the second region of interest 111$_2$, and the other region 111$_3$ using the region-of-interest detector 68. In addition, in a case in which the calcification P1 is not included in the normal two-dimensional image 111, the first region of interest 111$_1$ is not detected. Further, in a case in which the other lesion P2 is not included in the normal two-dimensional image 111, the second region of interest 111$_2$ is not detected. The region-of-interest detection unit 82 outputs the detected first region of interest 111$_1$, second region of interest 111$_2$, and other region 111$_3$ to the image generation model generation unit 84.

The image generation model generation unit 84 includes the loss function calculation unit 85 and the weight update unit 86. The image generation model generation unit 84 has a function of performing machine learning on a machine learning model using the training data 64 as described above to generate the image generation model 66 that receives a plurality of tomographic images as an input and that outputs a pseudo two-dimensional image.

The loss function calculation unit 85 calculates the loss function indicating the degree of difference between the pseudo two-dimensional image 103 output from the image generation model 66 and the normal two-dimensional image 111 of the training data 64 using the above-described Expression (1) as described above.

The weight update unit 86 updates the weight of the network in the image generation model 66 according to the loss function calculated by the loss function calculation unit 85 as described above.

The image generation model generation unit 84 stores the generated image generation model 66 in the storage unit 62.

Next, the operation of the image processing device 16 according to this embodiment in the learning phase will be described with reference to FIG. 8. The CPU 60A executes the learning program 63A stored in the storage unit 62 such that a learning process illustrated in FIG. 8 is performed.

Figure 8:
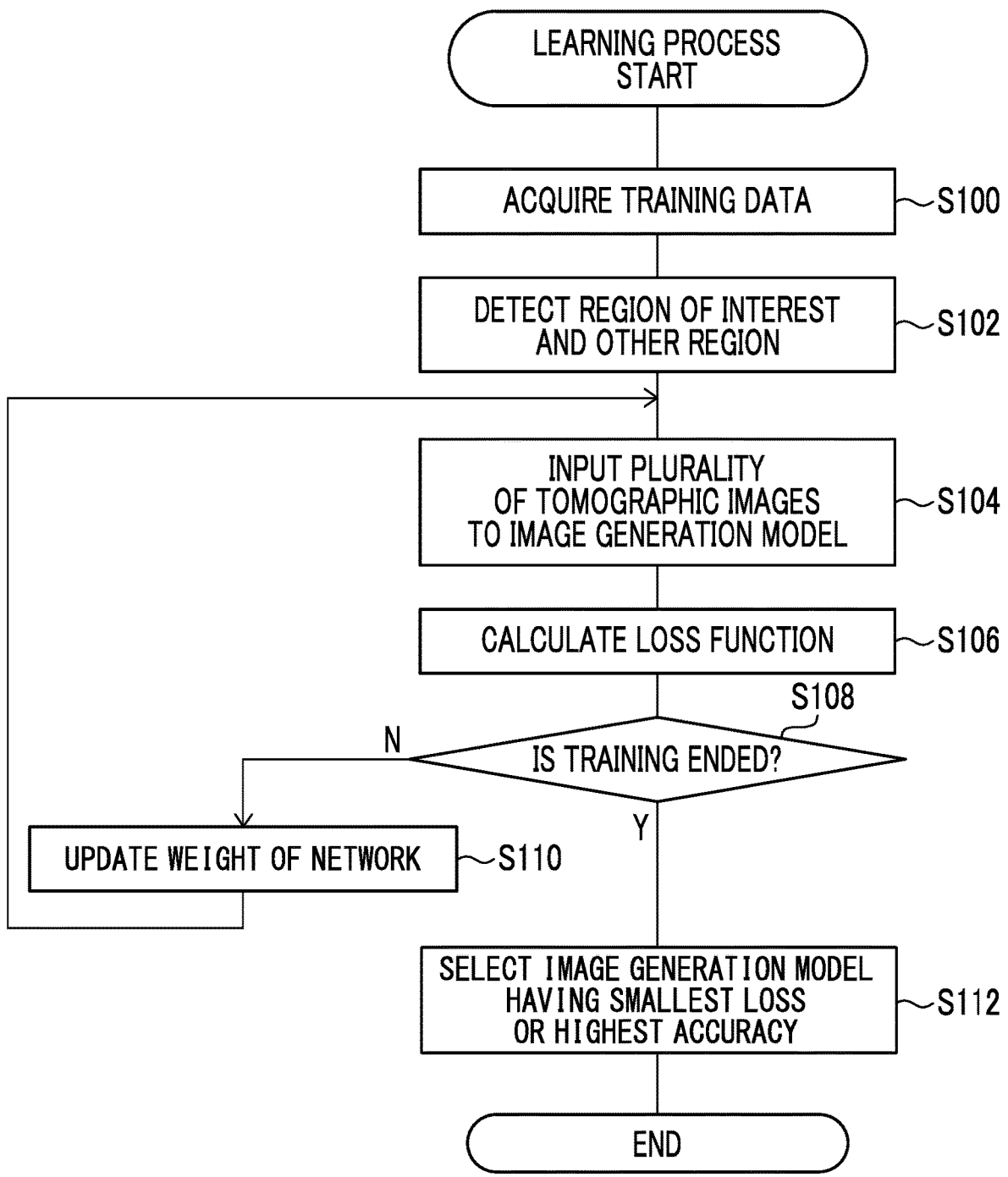
FIG. 8 is a flowchart illustrating an example of a flow of a learning process by the image processing device according to the embodiment.

In Step S100 of FIG. 8, the training data acquisition unit 80 acquires the training data 64 from the storage unit 62 as described above.

Then, in Step S102, as described above, the region-of-interest detection unit 82 detects the first region of interest 111$_1$, the second region of interest 111$_2$, and the other region 111$_3$ from the normal two-dimensional image 111 included in the training data 64 acquired in Step S100.

Then, in Step S104, the image generation model generation unit 84 inputs the plurality of tomographic images 101 included in the training data 64 acquired in Step S100 to the image generation model 66 as described above.

Then, in Step S106, the loss function calculation unit 85 acquires the pseudo two-dimensional image 103 output from the image generation model 66 and calculates a loss function indicating the degree of difference between the pseudo two-dimensional image 103 output from the image generation model 66 and the normal two-dimensional image 111 of the training data 64 as described above.

Then, in Step S108, the region-of-interest detection unit 82 determines whether or not to end the training. In this embodiment, the image generation model 66 having the smallest output of the loss function after a predetermined number of training operations is finally adopted. Therefore, the region-of-interest detection unit 82 determines whether or not the training has been performed a predetermined number of times. Specifically, the region-of-interest detection unit 82 determines whether or not the processes in Steps S104 and S106 have been performed a predetermined number of times. In a case in which the training has not been performed a predetermined number of times, that is, in a case in which the number of training operations is less than a predetermined value, the determination result in Step S108 is "No" since the training has not been completed yet. Then, the process proceeds to Step S110.

In Step S110, the weight update unit 86 updates the weight of the network in the image generation model 66 according to the loss function calculated in Step S106 as described above.

In a case in which the weight of the network in the image generation model 66 is updated in Step S110, the process returns to Step S104. Then, the processes in Steps S104 to S108 are repeated to perform the training again. As a result, a plurality of image generation models 66 corresponding to the number of training operations are obtained.

On the other hand, in a case in which the number of training operations is equal to or more than the predetermined value, the determination result in Step S108 is "Yes" in order to end the training, and the process proceeds to Step S112.

In Step S112, the detection unit 84 selects, as the image generation model 66 finally obtained by training, an image generation model having the smallest loss or the highest accuracy calculated in Step S106 from the plurality of image generation models 66 corresponding to the number of training operations. In a case in which the process in Step S112 ends, the learning process illustrated in FIG. 8 ends.

In addition, the present disclosure is not limited to this learning process. For example, a threshold value may be set according to whether or not the pseudo two-dimensional image 103 output from the image generation model 66 is sufficiently close to the normal two-dimensional image 111 or whether or not the reproducibility of the shape of the calcification P1 in the pseudo two-dimensional image 103 is high. In a case in which the output of the loss function is equal to or less than the threshold value, the training may be ended. A model at that time may be used as the image generation model 66.

Operation Phase

Next, an operation phase that generates a pseudo two-dimensional image using the image generation model 66 trained as described above will be described.

Figure 9:
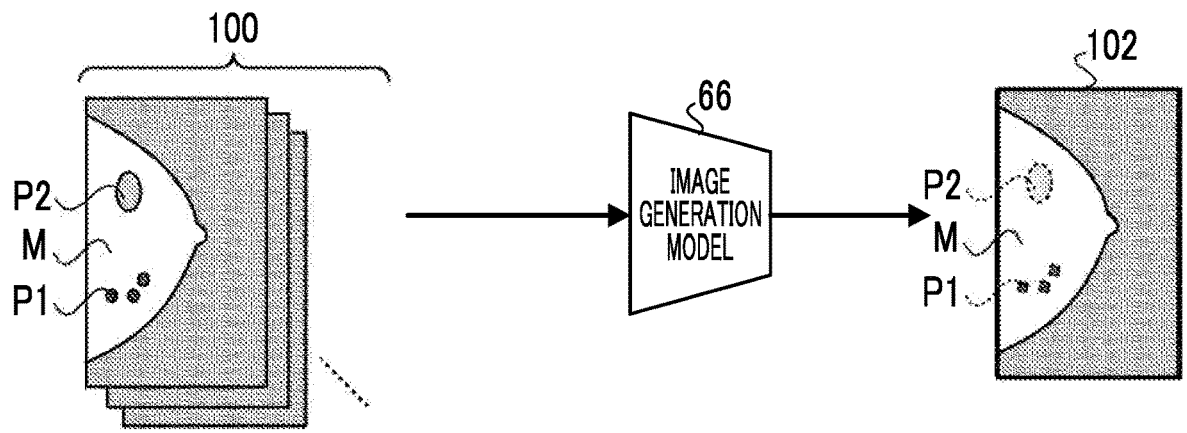
FIG. 9 is a schematic diagram illustrating an outline of a flow of the generation of a pseudo two-dimensional image using the image generation model in the image processing device according to the embodiment.

FIG. 9 is a schematic diagram illustrating the outline of the flow of the generation of a pseudo two-dimensional image 102 using the image generation model 66 in the image processing device 16 according to this embodiment. As illustrated in FIG. 9, the image processing device 16 generates the pseudo two-dimensional image 102 by inputting the plurality of tomographic images 100 to the image generation model 66 such that the image generation model 66 outputs the pseudo two-dimensional image 102. In addition, during the operation of the image generation model 66, the plurality of tomographic images 100 may be input in units of voxels, and patches of the pseudo two-dimensional image 102 may be created and combined to generate the pseudo two-dimensional image 102.

Figure 10:
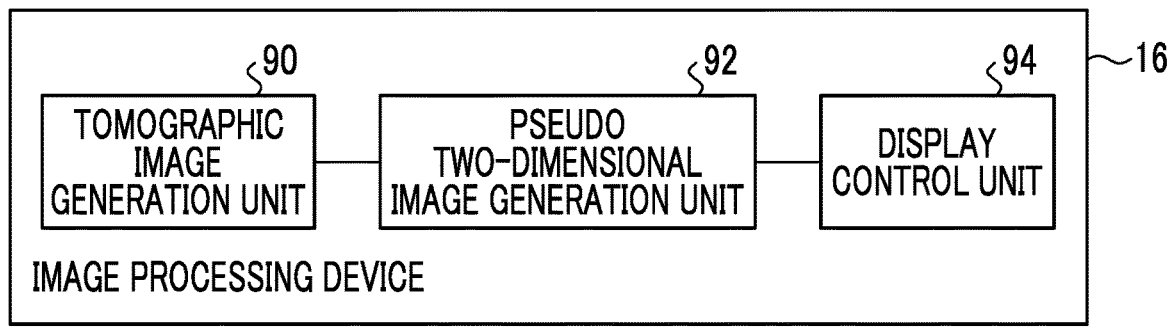
FIG. 10 is a functional block diagram illustrating an example of a configuration related to a function of generating the pseudo two-dimensional image in the image processing device according to the embodiment.

FIG. 10 is a functional block diagram illustrating an example of a configuration related to the function of generating the pseudo two-dimensional image 102 in the image processing device 16. As illustrated in FIG. 10, the image processing device 16 comprises a tomographic image generation unit 90, a pseudo two-dimensional image generation unit 92, and a display control unit 94. For example, in the image processing device 16 according to this embodiment, the CPU 60A of the control unit 60 executes the image generation program 63B stored in the storage unit 62 to function as the tomographic image generation unit 90, the pseudo two-dimensional image generation unit 92, and the display control unit 94.

The tomographic image generation unit 90 has a function of generating a plurality of tomographic images from a series of a plurality of projection images. The tomographic image generation unit 90 acquires a desired series of a plurality of projection images from the console 12 of the mammography apparatus 10 or from the PACS 14 on the basis of an execution instruction to generate the pseudo two-dimensional image. Then, the tomographic image generation unit 90 generates a plurality of tomographic images 100 having different heights from the imaging surface 24A from the acquired series of the plurality of projection images. In addition, the method by which the tomographic image generation unit 90 generates the plurality of tomographic images 100 is not particularly limited. For example, the tomographic image generation unit 90 can reconstruct a series of a plurality of projection images, using a back projection method, such as a filter back projection (FBP) method or an iterative reconstruction method, to generate the plurality of tomographic images 100. The tomographic image generation unit 90 outputs the generated plurality of tomographic images 100 to the pseudo two-dimensional image generation unit 92.

The pseudo two-dimensional image generation unit 92 has a function of generating the pseudo two-dimensional image 102 using the image generation model 66 as illustrated in FIG. 9. The pseudo two-dimensional image generation unit 92 inputs the plurality of tomographic images 100 to the image generation model 66. As described above, the image generation model 66 outputs the pseudo two-dimensional image 102. The pseudo two-dimensional image generation unit 92 acquires the pseudo two-dimensional image 102 output from the image generation model 66 and outputs the pseudo two-dimensional image 102 to the display control unit 94.

The display control unit 94 has a function of performing control to display the pseudo two-dimensional image 102 generated by the pseudo two-dimensional image generation unit 92 on the display unit 70.

Next, the generation of the pseudo two-dimensional image 102 in the image processing device 16 according to this embodiment will be described with reference to FIG. 11. The CPU 60A executes the image generation program 63B stored in the storage unit 62 such that an image generation process illustrated in FIG. 11 is performed.

Figure 11:
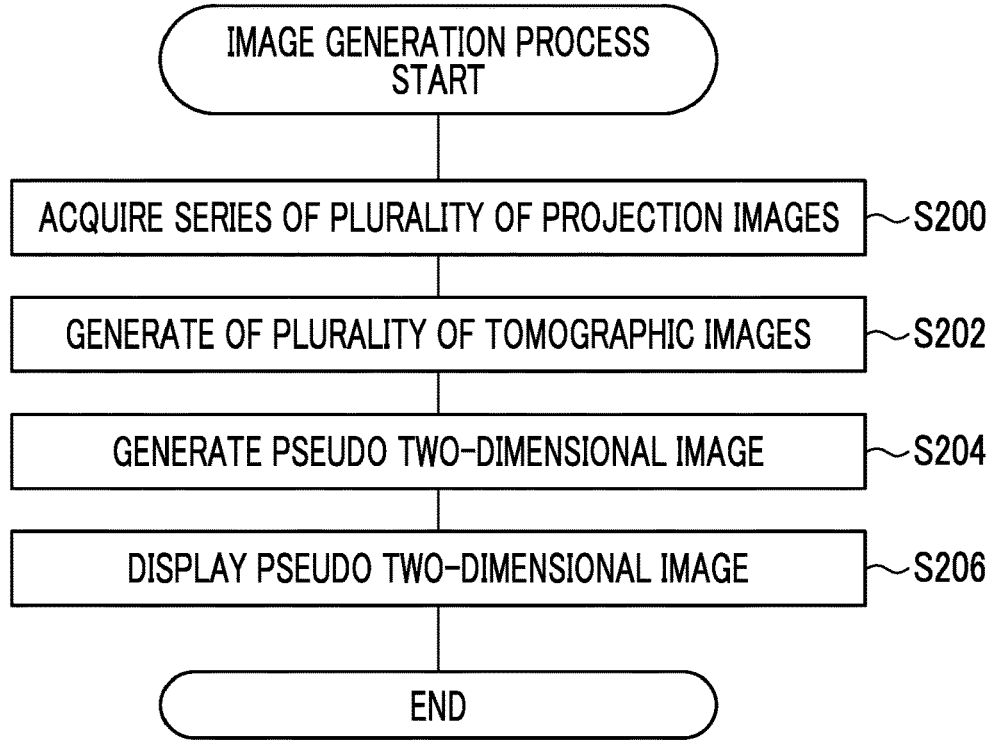
FIG. 11 is a flowchart illustrating an example of a flow of an image generation process by the image processing device according to the embodiment.

In Step S200 of FIG. 11, the tomographic image generation unit 90 acquires a series of a plurality of projection images from the console 12 of the mammography apparatus 10 or from the PACS 14 as described above.

Then, in Step S202, the tomographic image generation unit 90 generates a plurality of tomographic images 100 from the series of the plurality of projection images acquired in Step S200 as described above.

Then, in Step S204, the pseudo two-dimensional image generation unit 92 generates the pseudo two-dimensional image 102 using the image generation model 66 as described above. Specifically, the plurality of tomographic images 100 generated in Step S202 are input to the image generation model 66, and the pseudo two-dimensional image 102 output from the image generation model 66 is acquired.

Then, in Step S206, the display control unit 94 performs control to display the pseudo two-dimensional image 102 obtained in Step S204 on the display unit 70. In addition, the display aspect of displaying the pseudo two-dimensional image 102 on the display unit 70 is not particularly limited. For example, only the pseudo two-dimensional image 102 may be displayed on the display unit 70, or the plurality of tomographic images 100 and the pseudo two-dimensional image 102 may be displayed on the display unit 70. In a case in which the process in Step S206 ends, the image generation process illustrated in FIG. 11 ends.

Further, each of the learning phase and the operation phase described above is an example, and various modification examples are possible. For example, each of the learning phase and the operation phase may be modified as described below.

Modification Example 1: Modification Example of Learning Phase

Figure 12:
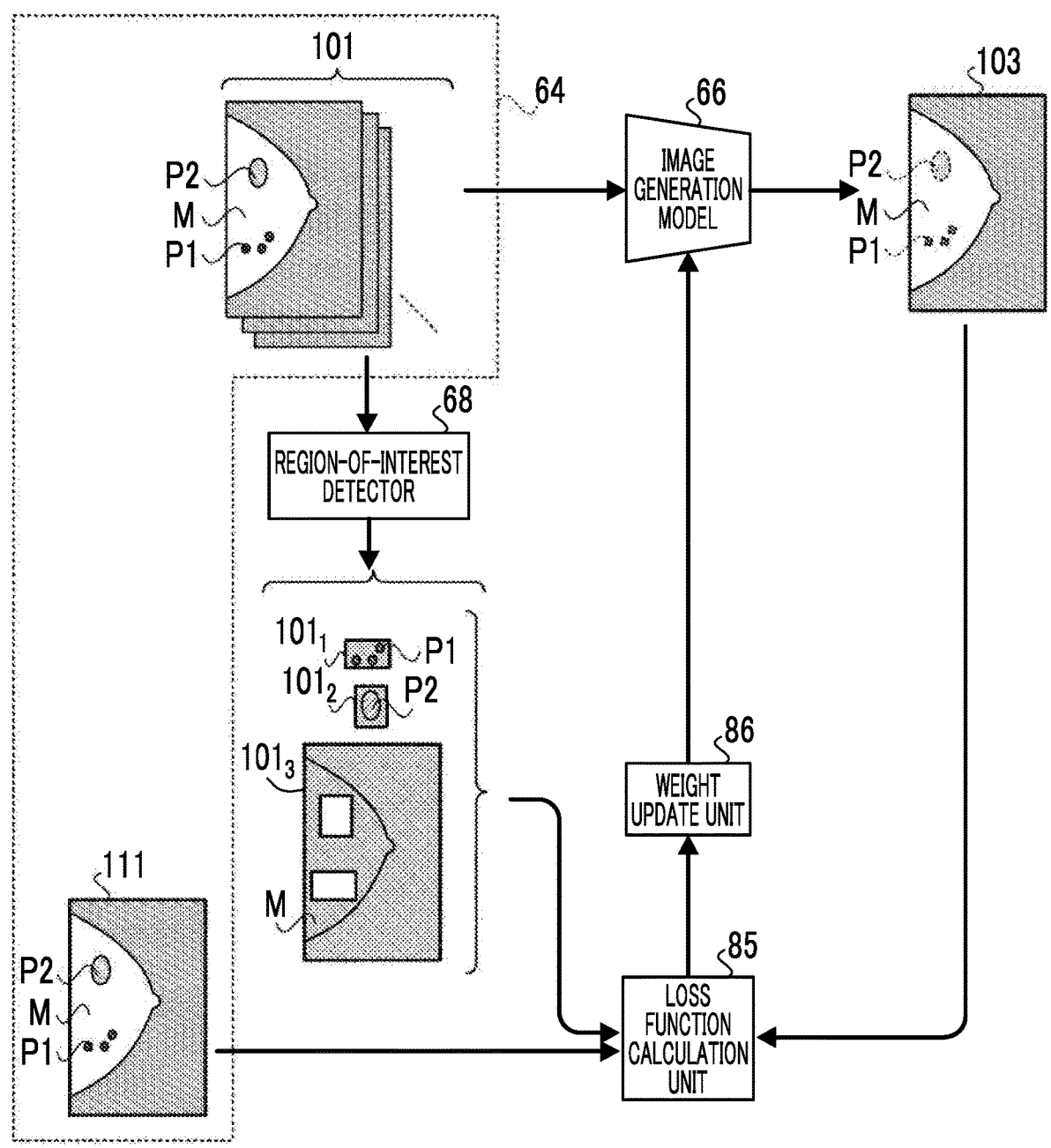
FIG. 12 is a schematic diagram illustrating an outline of a flow of the training of an image generation model in an image processing device according to Modification Example 1.

FIG. 12 is a schematic diagram illustrating the outline of the flow of the training of the image generation model 66 in the image processing device 16 according to this modification example.

In the above-described embodiment, the aspect in which the image from which the first region of interest and the second region of interest are to be detected is the normal two-dimensional image 111 has been described. However, the image from which the first region of interest and the second region of interest are to be detected is not limited to the normal two-dimensional image 111. In the example illustrated in FIG. 12, an aspect in which the image from which the first region of interest and the second region of interest are to be detected is the tomographic image 101 will be described.

As illustrated in FIG. 12, in this modification example, the first region of interest 1011 including the calcification P1, the second region of interest 1012 including the other lesion P2, and the other region 1013 are detected from the tomographic image 101.

In this modification example, in Step S102 of the learning process illustrated in FIG. 8, the region-of-interest detection unit 82 detects the first region of interest 1011, the second region of interest 1012, and the other region 1013 from the plurality of tomographic images 101 included in the training data 64 acquired in Step S100. In addition, the region-of-interest detection unit 82 according to this modification example detects the calcification P1 and the other lesion P2 from each of the plurality of tomographic images 101 and detects, as the region of each of the calcification P1 and the other lesion P2, the outermost contour in a case in which the detected calcification P1 and other lesion P2 are superimposed in a height direction of the tomographic images 101. Then, the region-of-interest detection unit 82 detects the first region of interest 1011, the second region of interest 1012, and the other region 1013 on the basis of the region of each of the detected calcification P1 and other lesion P2.

As described above, according to this modification example, it is possible to easily detect the calcification P1 and the other lesions P2 that are difficult to see due to the overlap of the mammary glands and the like.

In addition, the image from which the first region of interest and the second region of interest are to be detected is not limited to the plurality of tomographic images 101 and may be a series of a plurality of projection images used to obtain the plurality of tomographic images 101.

Modification Example 2: Modification Example of Learning Phase

Figure 13:
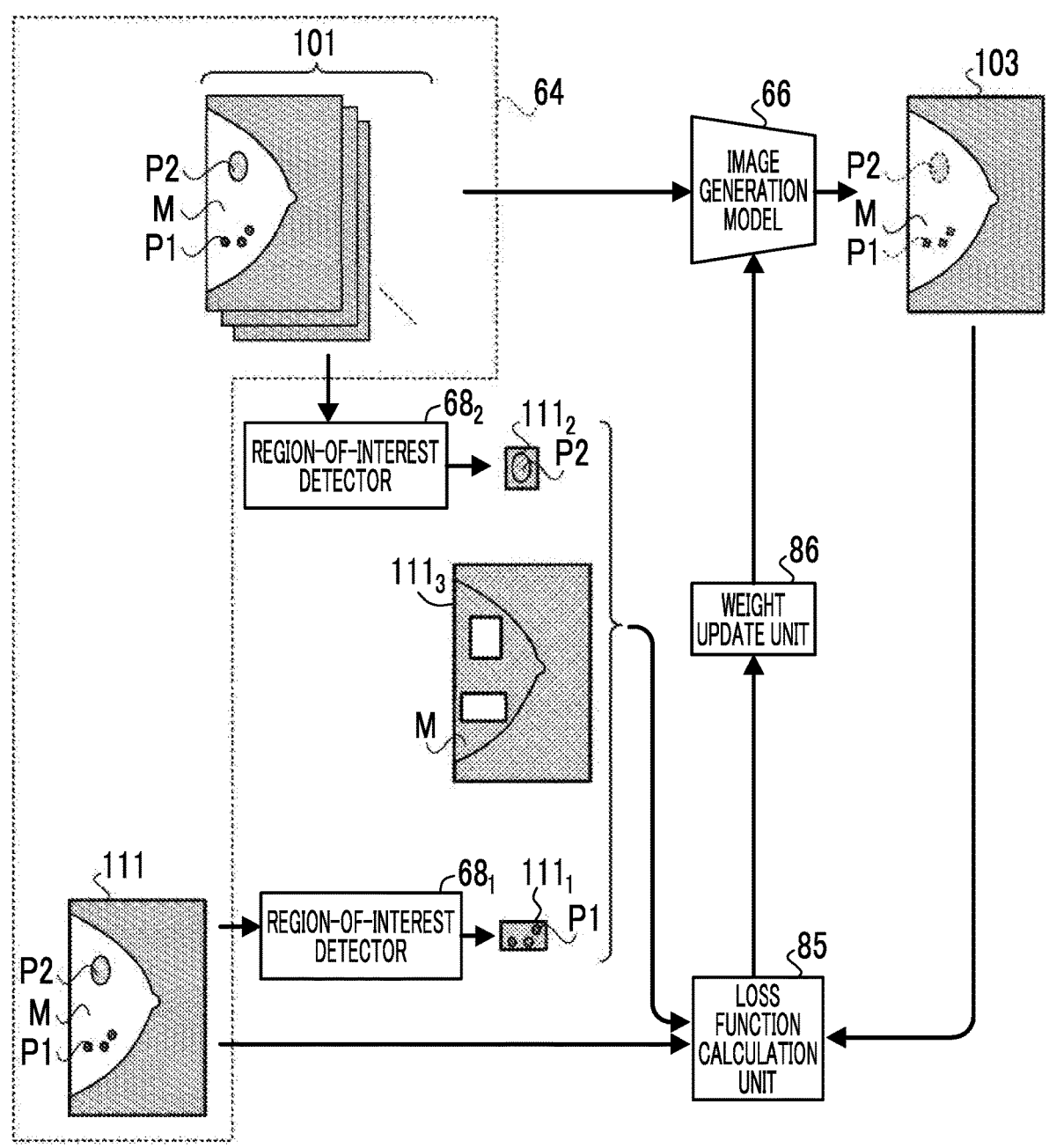
FIG. 13 is a schematic diagram illustrating an outline of a flow of the training of an image generation model in an image processing device according to Modification Example 2.

FIG. 13 is a schematic diagram illustrating the outline of the flow of the training of the image generation model 66 in the image processing device 16 according to this modification example.

The signal of the calcification P1 is weak. Therefore, the calcification P1 is difficult to see in the tomographic image having a low radiation dose per image because the calcification P1 is buried in noise. Therefore, it is preferable to detect the calcification P1 from a two-dimensional image, such as a normal two-dimensional image, having a higher radiation dose per image than the tomographic image. Meanwhile, in some cases, the tumor is hidden by the overlapping mammary glands and is difficult to see. Therefore, it is preferable to detect the tumor from the tomographic image 101. Further, in a case in which the mammary glands overlap, they may look like a tumor or a spicula. Therefore, it is preferable to detect the tumor or the spicula from the tomographic image 101. Therefore, in this modification example, as illustrated in FIG. 13, for the calcification P1, as described in the above embodiment, the calcification P1 (first region of interest $111_1$) is detected from the normal two-dimensional image 111. For the other lesion P2, the other lesion P2 (second region of interest $111_2$) is detected from each of the plurality of tomographic images 101. Further, in the example illustrated in FIG. 13, a region-of-interest detector 681 for detecting the calcification P1 and a region-of-interest detector 682 for detecting the other lesion P2 are described separately. However, as in the above-described embodiment (see FIG. 6), the calcification P1 and the other lesion P2 may be detected by one region-of-interest detector 68.

In this modification example, in Step S102 of the learning process illustrated in FIG. 8, the region-of-interest detection unit 82 detects the first region of interest $111_1$ from the normal two-dimensional image 111 included in the training data 64 acquired in Step S100 and detects the second region of interest $111_2$ from each of the plurality of tomographic images 101 included in the training data 64. In addition, the region-of-interest detection unit 82 detects, as the other region $111_3$, a region excluding the first region of interest $111_1$ and the second region of interest $111_2$ from the normal two-dimensional image 111.

As described above, in this modification example, the calcification P1 (first region of interest $111_1$) is detected from the normal two-dimensional image 111, and the other lesion P2 (second region of interest $111_2$) is detected from the tomographic image 101. Therefore, it is possible to improve the accuracy of detecting the calcification P1 and the other lesions P2.

In addition, it is preferable to detect the calcification P1 (first region of interest $111_1$) from the two-dimensional image as described above. Therefore, the calcification P1 (first region of interest $111_1$) may be detected from a composite two-dimensional image obtained by combining at least some of the plurality of tomographic images 101, instead of the normal two-dimensional image 111. In addition, a method for generating the composite two-dimensional image is not particularly limited. For example, the composite two-dimensional image may be generated by combining the plurality of tomographic images 101 using an addition method, an averaging method, a maximum intensity projection method, a minimum intensity projection method, or the like.

Modification Example 3: Modification Example of Learning Phase

Figure 14:
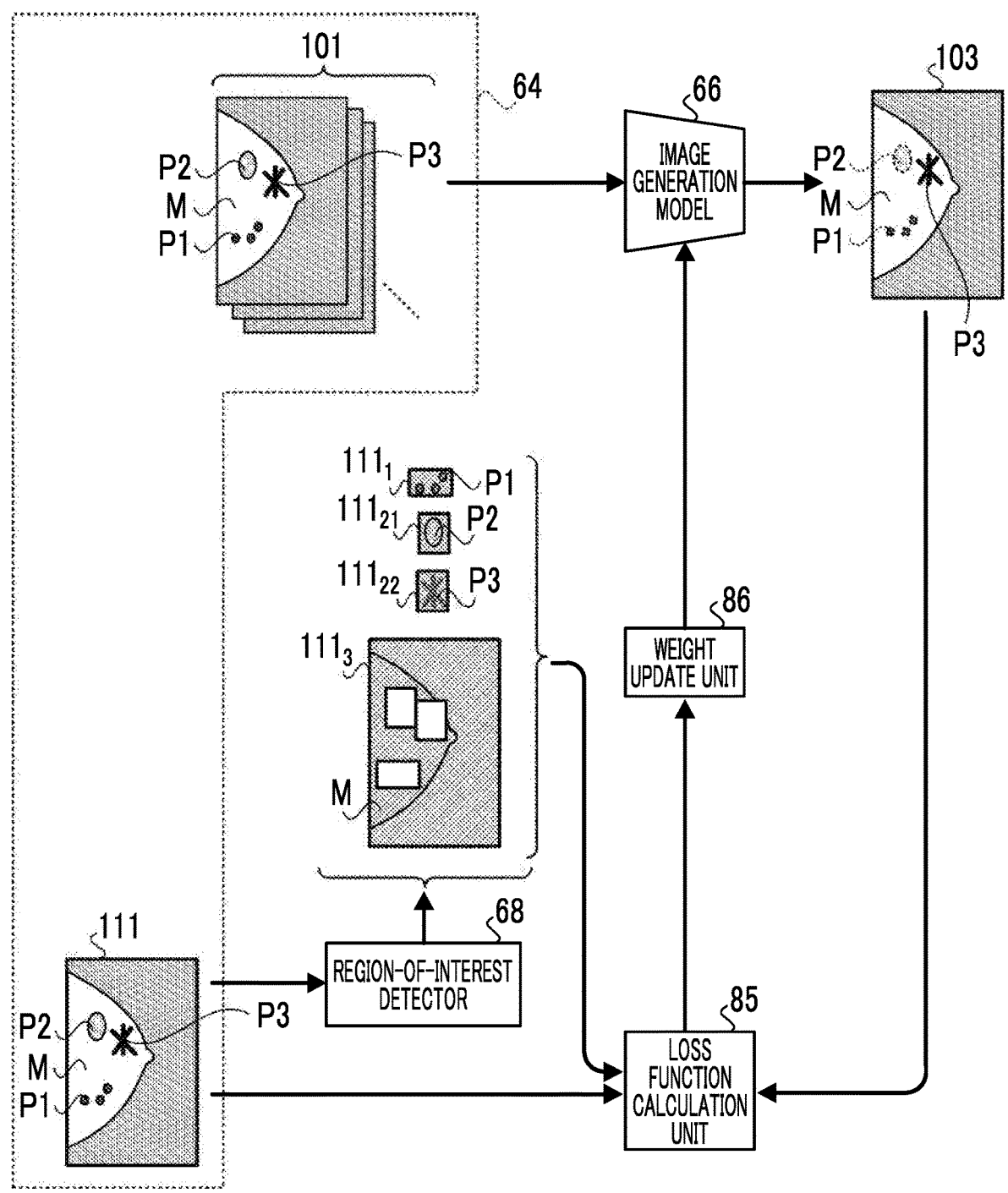
FIG. 14 is a schematic diagram illustrating an outline of a flow of the training of an image generation model in an image processing device according to Modification Example 3.

FIG. 14 is a schematic diagram illustrating the outline of the flow of the training of the image generation model 66 in the image processing device 16 according to this modification example.

In the above-described embodiment, the aspect in which the relationship between weights in the image generation model 66 is not defined for the other lesion P2 and, for example, the same weight is used has been described. However, reproducibility may be desired to be higher than the reproducibility of other types depending on the type of the other lesion P2. Therefore, in this modification example, for the other lesion P2, the weight to be updated differs depending on the type of the lesion.

In the example illustrated in FIG. 14, the other lesion P2 is a tumor, and the region-of-interest detector 68 detects a spicula P3 (second region of interest $111_{22}$) in addition to the calcification P1 (first region of interest $111_1$) and the other lesion P2 (second region of interest $111_{21}$) which is a tumor. In addition, the other region $111_3$ is a region excluding the first region of interest $111_1$, the second region of interest $111_{21}$, and the second region of interest $111_{22}$ from the normal two-dimensional image 111.

The loss function calculation unit 85 calculates the loss function on the basis of the following Expression (3) instead of the above-described Expression (1).

Difference between pseudo two-dimensional image 103 and first region of interest $111_1$×weight $W111_1$+difference between pseudo two-dimensional image 103 and second region of interest $111_{21}$×weight $W111_{21}$+difference between pseudo two-dimensional image 103 and second region of interest $111_{22}$×weight $W111_{22}$+difference between pseudo two-dimensional image 103 and the other region $111_3$×weight $W111_2$  (3)

For example, in a case in which the reproducibility of the tumor is more important than the reproducibility of the spicula, weights satisfying the relationship of the following Expression (4) instead of the above-described Expression (2) are preset as the weights for each region of interest.

Weight $W111_1$>Weight $W111_{21}$>Weight $W111_{22}$≥Weight $W111_3$  (4)

Further, the weight update unit 86 updates the weight of the network in the image generation model 66 according to the loss function calculated by the loss function calculation unit 85 on the basis of the above-described Expression (3).

In this modification example, in Step S102 of the learning process illustrated in FIG. 8, the region-of-interest detection unit 82 detects the first region of interest $111_1$, the second region of interest $111_{21}$, and the second region of interest $111_{22}$ from the normal two-dimensional image 111 included in the training data 64 acquired in Step S100.

As described above, according to this modification example, it is possible to train the image generation model 66 such that the pseudo two-dimensional image 102 in which the reproducibility of a desired lesion among the other lesions P2 has been further improved can be generated.

Modification Example 4: Modification Example of Learning Phase

In some cases, the mammary gland volume of the breast affects the appearance of the calcification P1 and the tumor in a radiographic image. In particular, the tumor is likely to be affected by the mammary gland volume.

Therefore, in this modification example, the other lesion P2 is a tumor, and the weight $W111_2$ set for the second region of interest $111_2$ is adjusted according to the mammary gland volume of the breast. In addition, for convenience of explanation, in this modification example, the other lesion P2 is rephrased as a "tumor P2".

For example, in the case of a so-called dense breast (high-density breast) having a large mammary gland volume, the tumor P2 may be hidden by the mammary glands and may be difficult to see. Therefore, in this modification example, for the tumor P2, the weight $W111_2$ set for the second region of interest $111_2$ is adjusted according to the mammary gland volume to suppress a reduction in the reproducibility of the tumor P2.

The loss function calculation unit 85 according to this embodiment derives the mammary gland volume of the breast from the normal two-dimensional image 111. Specifically, the loss function calculation unit 85 derives a mammary gland content indicating the content of the mammary glands in a thickness direction of the breast, which is the irradiation direction of the radiation R, as the mammary gland volume for each pixel of the normal two-dimensional image 111. In a case in which there are no mammary glands and the breast consists of only fat, the mammary gland content is "0". As the value of mammary gland density becomes larger, the mammary gland content becomes larger. In addition, the method by which the loss function calculation unit 85 derives the mammary gland content is not particularly limited, and a known method can be applied. For example, the loss function calculation unit 85 can derive the mammary gland content on the basis of the pixel values of a region that does not include a breast M in each tomographic image, that is, a so-called blank region, the pixel values of pixels corresponding to fat, the pixel values of the pixels for which the mammary gland content is derived, and an average attenuation coefficient ratio between the mammary gland and fat (an average attenuation coefficient of the mammary gland/an average attenuation coefficient of fat).

Then, the loss function calculation unit 85 adjusts the weight $W111_2$ for the second region of interest $111_2$ on the basis of the mammary gland volume while maintaining the relationship of the above-described Expression (2) and calculates the loss function using the adjusted weight $W111_2$. For example, in a case in which the mammary gland volume is small, the loss function calculation unit 85 sets the weight $W111_2$ for the second region of interest $111_2$ corresponding to the tumor P2 to be significantly smaller than the weight $W111_1$ for the first region of interest $111_1$ corresponding to the calcification P1 (the weight $W111_1$>>>the weight $W111_2$). In addition, in a case in which the mammary gland volume is large, the loss function calculation unit 85 sets the weight $W111_2$ for the second region of interest $111_2$ corresponding to the tumor P2 to be smaller than the weight Willi for the first region of interest $111_1$ corresponding to the calcification P1 such that the difference between the weights is less than that in a case in which the mammary gland volume is small (the weight $W111_1$>the weight $W111_2$). That is, as the mammary gland volume becomes smaller, the weight for the second region of interest $111_2$ corresponding to the tumor P2 becomes smaller than the weight for the first region of interest $111_1$ corresponding to the calcification P1.

Figure 15:
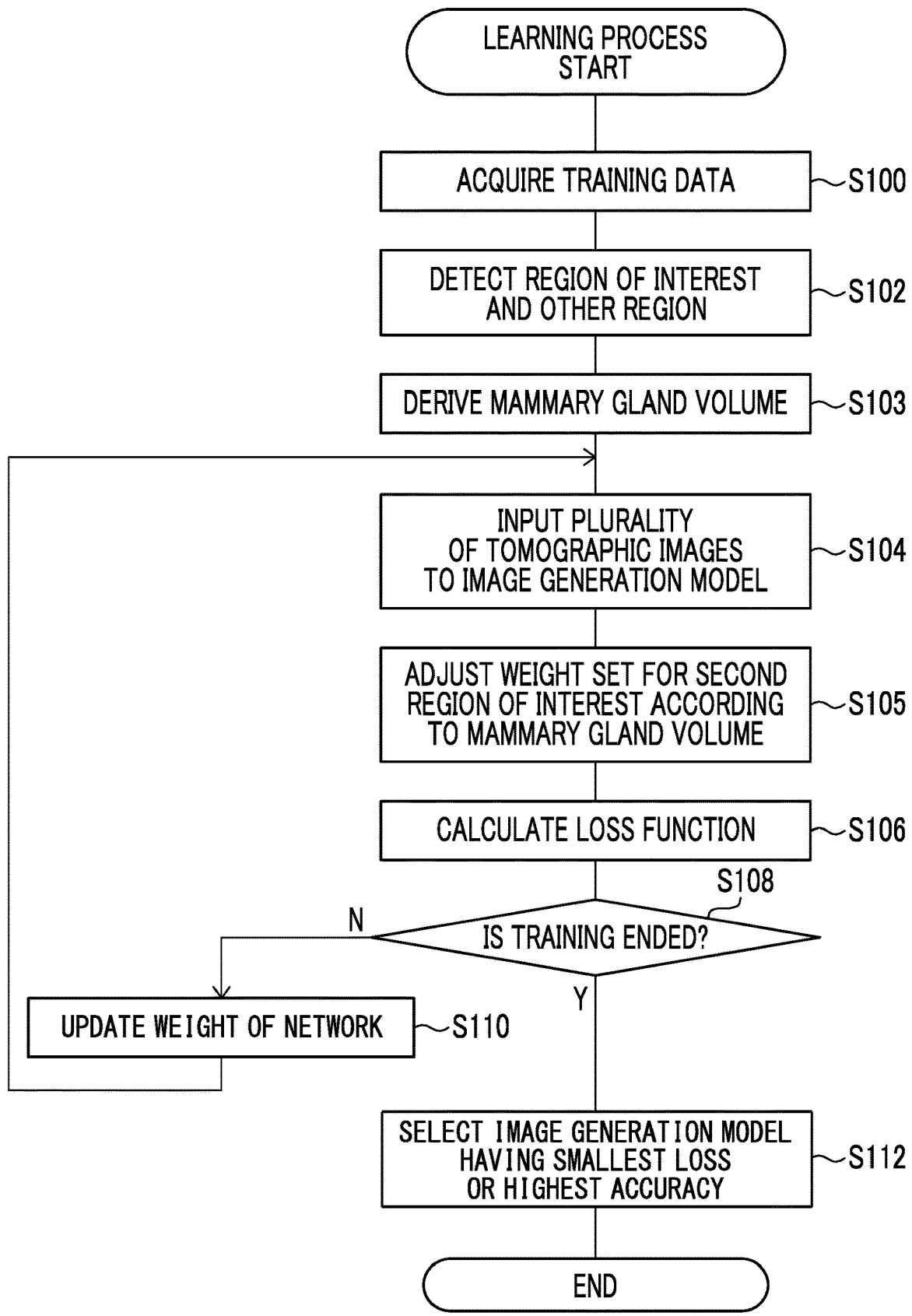
FIG. 15 is a flowchart illustrating an example of a flow of a learning process by an image processing device according to Modification Example 4.

FIG. 15 is a flowchart illustrating an example of the flow of a learning process by the image processing device 16 according to this modification example. The learning process illustrated in FIG. 15 differs from the learning process (see FIG. 8) according to the above-described embodiment in that it comprises Step S103 between Steps S102 and S104 and comprises Step S105 between Steps S104 and S106.

After Step S102, the weight update unit 86 derives the mammary gland volume as described above in Step S103. Then, the process proceeds to Step S104. In this modification example, as described above, the mammary gland content is derived for each pixel of the first region of interest $111_1$ and the second region of interest $111_2$.

Further, in Step S105, the loss function calculation unit 85 adjusts the weight $W111_2$ set for the second region of interest $111_2$ to be smaller than the weight $W111_1$ for the first region of interest $111_1$ as the derived mammary gland content becomes smaller while maintaining the relationship of the above-described Expression (2) as described above.

Then, in Step S106, the loss function calculation unit 85 calculates the loss function using the adjusted weight $W111_2$.

As described above, according to this modification example, the weight $W111_2$ set for the second region of interest $111_2$ is adjusted according to the mammary gland volume of the breast. Therefore, it is possible to suppress the influence of the mammary gland volume on the reproducibility of the tumor P2.

Further, in this modification example, the aspect in which the value of the weight $W111_2$ set for the second region of interest $111_2$ is adjusted according to the mammary gland volume (mammary gland content) has been described. However, the aspect in which the weight is adjusted according to the mammary gland volume is not limited to this modification example. For example, at least one of the weight $W111_1$ set for the first region of interest $111_1$ or the weight $W111_2$ set for the second region of interest $111_2$ may be adjusted according to the mammary gland volume. For example, the weight $W111_1$ for the first region of interest $111_1$ corresponding to the calcification P1 may be adjusted such that the weight $W111_1$ becomes larger as the mammary gland volume becomes larger and becomes smaller as the mammary gland volume becomes smaller. Further, for example, the value of the weight for the other region $111_3$ may be adjusted according to the mammary gland volume. In addition, in this case, the other region $111_3$ is an example of a third region of interest according to the present disclosure.

Modification Example 5: Modification Example of Learning Phase

In some cases, the positional deviation of the breast M, the calcification P1, the other lesion P2, and the like occurs between the plurality of tomographic images 101 included in the training data 64 and the normal two-dimensional image 111. In a case in which the time when a series of plurality of projection images for obtaining the tomographic images 101 is captured is different from the time when the normal two-dimensional image 111 is captured, the positional deviation of the breast M, the calcification P1, the other lesion P2, and the like may occur between the plurality of tomographic images 101 and the normal two-dimensional image 111. Even in a case in which the tomosynthesis imaging and the normal imaging are performed with the breast compressed by the compression plate 30, in other words, without releasing the compression of the breast by the compression plate 30 between the tomosynthesis imaging and the normal imaging, this positional deviation may occur due to the body movement of the subject or the deformation of the breast.

Therefore, the image generation model generation unit 84 according to this modification example inputs each of the plurality of tomographic images 101 to the image generation model 66 after correcting the positional deviation between each of the plurality of tomographic images 101 and the normal two-dimensional image 111. In addition, the method by which the image generation model generation unit 84 corrects the positional deviation between each of the plurality of tomographic images 100 and the normal two-dimensional image 111 is not particularly limited. For example, the image generation model generation unit 84 derives the amount of positional deviation of the skin line of the breast M and the direction of the positional deviation and corrects the positional deviation such that the skin line in each of the plurality of tomographic images 101 is matched with the skin line in the normal two-dimensional image 111. Further, an example of a method for detecting the skin line is a method that sequentially searches for a boundary point between the region of the breast M and a blank region in each of the plurality of tomographic images 101 and the normal two-dimensional image 111 and connects the searched for pixels to detect the skin line.

Figure 16:
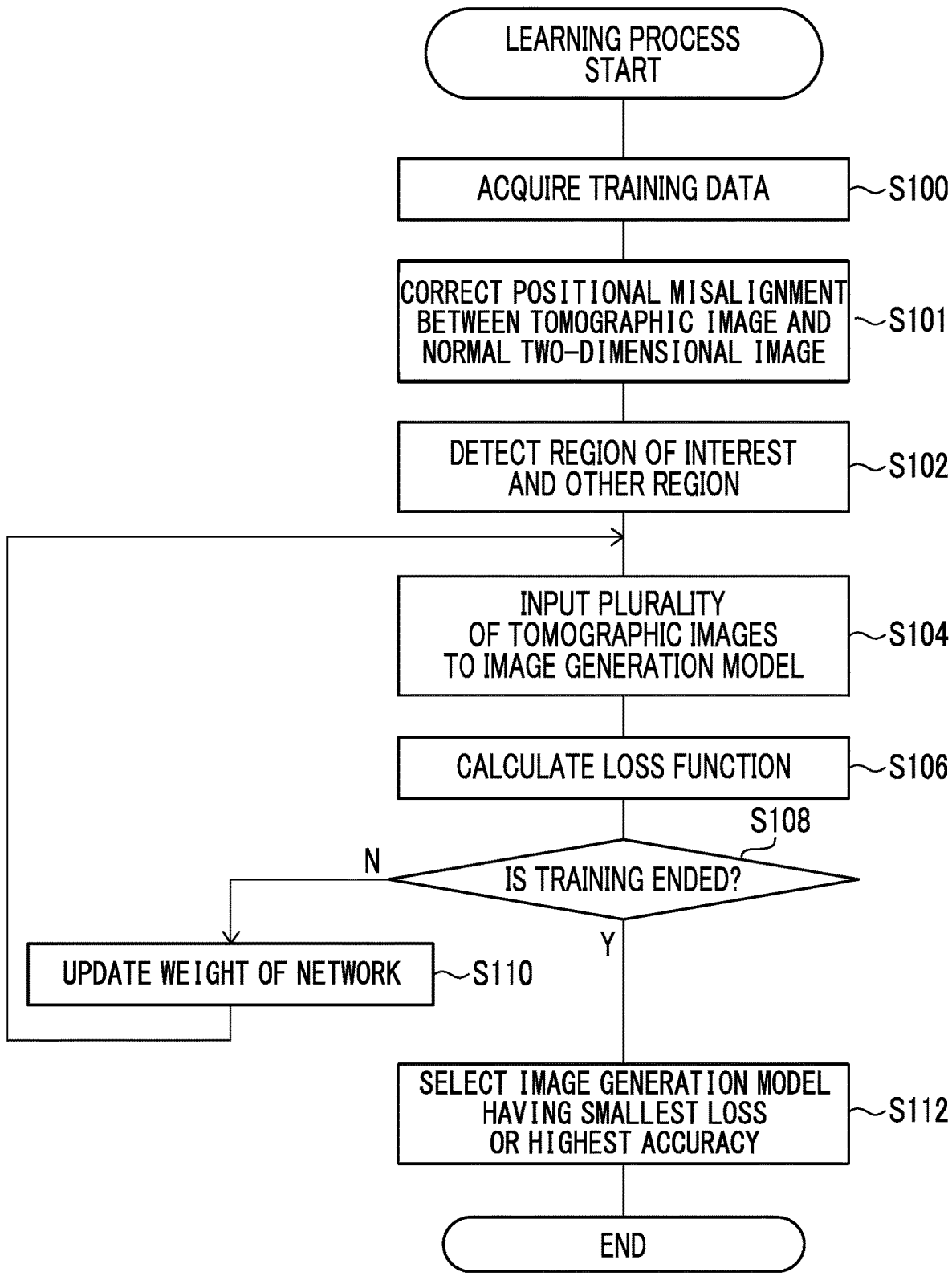
FIG. 16 is a flowchart illustrating an example of a flow of a learning process by an image processing device according to Modification Example 5.

FIG. 16 is a flowchart illustrating an example of the flow of a learning process by the image processing device 16 according to this modification example. The learning process illustrated in FIG. 16 is different from the learning process (see FIG. 8) according to the above-described embodiment in that it comprises Step S101 between Step S100 and Step S102.

After Step S100, in Step S101, the image generation model generation unit 84 corrects the positional misalignment between each of the plurality of tomographic images 100 and the normal two-dimensional image 111 such that the skin lines of the breasts M are matched with each other as described above.

Then, in Step S104, the plurality of tomographic images 101 whose positional deviation from the normal two-dimensional image 111 has been corrected are input to the image generation model 66.

As described above, according to this modification example, it is possible to prevent the occurrence of the positional deviation between the normal two-dimensional image 111 and each of the plurality of tomographic images 101 which are the training data 64. Therefore, it is possible to further improve the reproducibility of the pseudo two-dimensional image 102 by the image generation model 66.

Modification Example 6: Modification Example of Learning Phase

Figure 17:
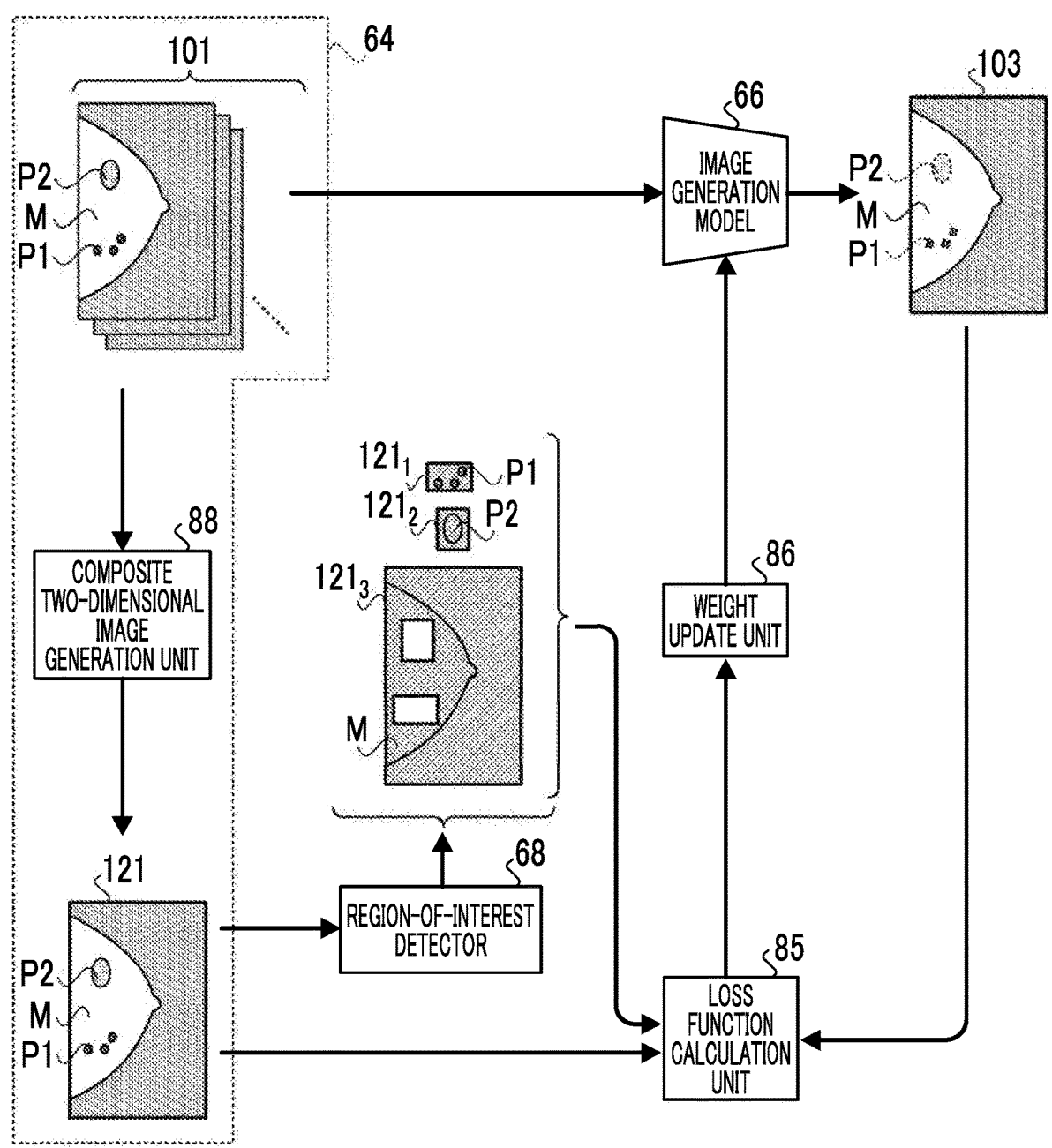
FIG. 17 is a schematic diagram illustrating an outline of a flow of the training of an image generation model in an image processing device according to Modification Example 6.

FIG. 17 shows a schematic diagram illustrating the outline of the flow of the training of the image generation model 66 in the image processing device 16 according to this modification example.

As illustrated in FIG. 17, in this modification example, the training data 64 includes a composite two-dimensional image 121 obtained by combining at least some of a plurality of tomographic images 101, instead of the normal two-dimensional image 111.

The image processing device 16 according to this modification example comprises a composite two-dimensional image generation unit 88. For example, in this modification example, the composite two-dimensional image generation unit 88 has a function of combining at least some of the plurality of tomographic images 101 to generate the composite two-dimensional image 121 that becomes the training data 64. For example, the composite two-dimensional image generation unit 88 can have the same configuration as a composite two-dimensional image generation unit 96 (see FIG. 19) according to the above-described Modification Example 6.

The loss function calculation unit 85 according to this modification example calculates a loss function between the composite two-dimensional image 121 and the pseudo two-dimensional image 103. A specific calculation method may replace the normal two-dimensional image 111 in the loss calculation of the loss function calculation unit 85 in the above-described embodiment with the composite two-dimensional image 121.

Further, the region-of-interest detection unit 82 according to this modification example detects a first region of interest $121_1$, a second region of interest $121_2$, and the other region $121_3$ from the composite two-dimensional image 121 using the region-of-interest detector 68. The region-of-interest detection unit 82 outputs the detected first region of interest $121_1$, second region of interest $121_2$, and other region $121_3$ to the image generation model generation unit 84.

As described above, according to this modification example, the weight for the network of the image generation model 66 is updated according to the loss function based on the difference between the composite two-dimensional image 121 and the pseudo two-dimensional image 103. In some cases, the tumor is difficult to see in the normal two-dimensional image 111. In this case, the composite two-dimensional image 121 is used instead of the normal two-dimensional image 111, which makes it possible to improve the accuracy of detecting the tumor.

Modification Example 7: Modification Example of Learning Phase

Figure 18:
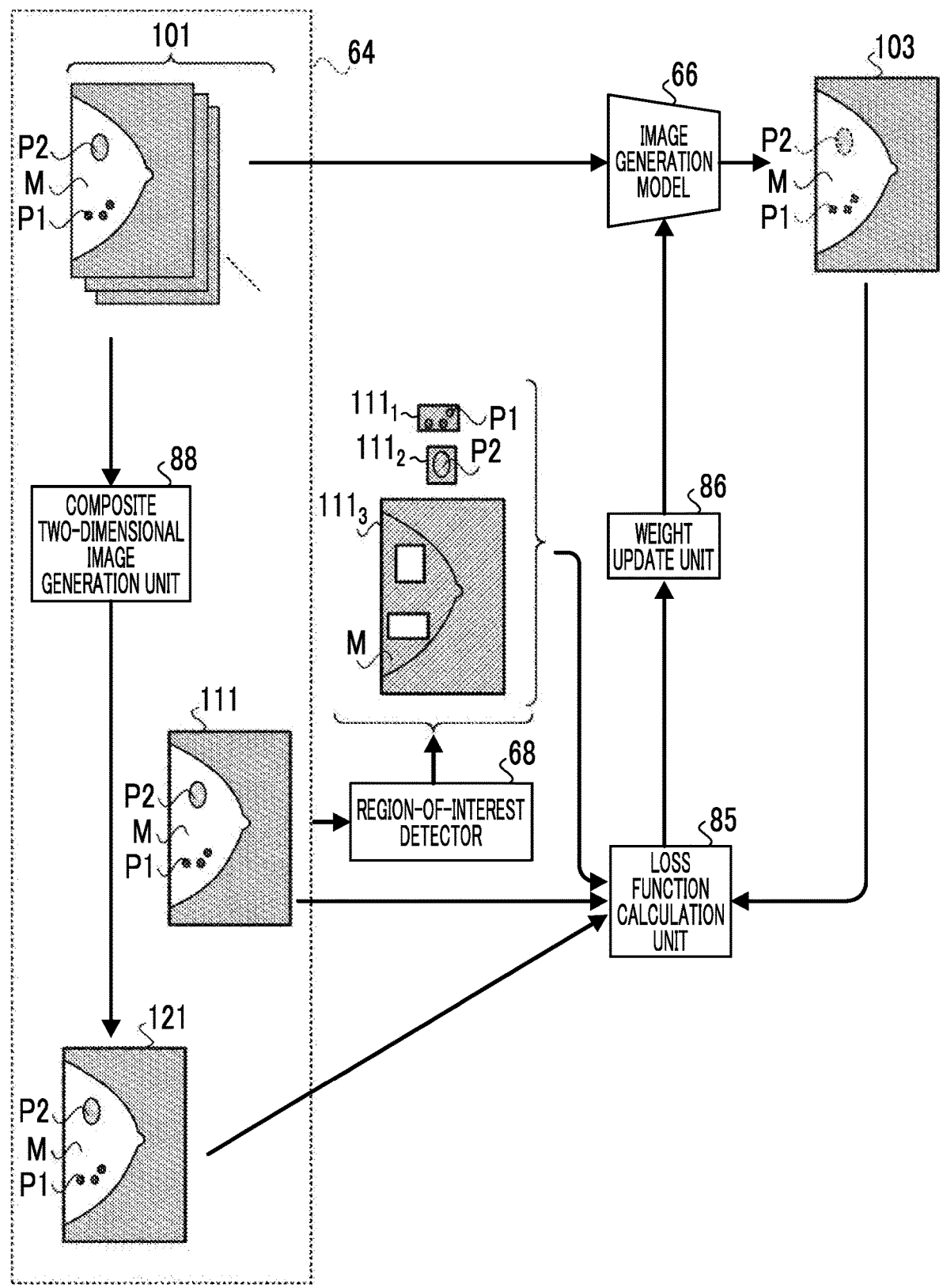
FIG. 18 is a schematic diagram illustrating an outline of a flow of the training of an image generation model in an image processing device according to Modification Example 7.

FIG. 18 is a schematic diagram illustrating the outline of the flow of the training of the image generation model 66 in the image processing device 16 according to this modification example.

As illustrated in FIG. 18, in this modification example, the training data 64 includes a normal two-dimensional image 111 and a composite two-dimensional image 121 obtained by combining at least some of a plurality of tomographic images 101. In addition, the composite two-dimensional image 121 included in the training data is the same as the composite two-dimensional image 121 (see FIG. 17) included in the training data 64 according to the above-described Modification Example 6.

The normal two-dimensional image 111 is a radiographic image in which the calcification P1 is relatively easy to see. On the other hand, the other lesion P2, such as a tumor, is difficult to see in the normal two-dimensional image 111 and may be easier to see in the composite two-dimensional image 121. Therefore, the training data 64 according to this modification example includes both the normal two-dimensional image 111 and the composite two-dimensional image 121.

The loss function calculation unit 85 according to this modification example calculates the loss function, using the difference between the normal two-dimensional image 111 and the pseudo two-dimensional image 103 for the first region of interest $111_1$ including the calcification P1 and using the difference between the composite two-dimensional image 121 and the pseudo two-dimensional image 103 for the second region of interest $111_2$ including the other lesion P2. For example, the loss function calculation unit 85 calculates the loss function on the basis of the following Expression (5) instead of the above-described Expression (1).

Difference between pseudo two-dimensional image 103 and first region of interest $111_1$ in normal two-dimensional image 111×weight $W111_1$+ difference between pseudo two-dimensional image 103 and second region of interest $111_2$ in composite two-dimensional image 121×weight $W111_2$ (5)

In the above-described Expression (5), the loss function is calculated using the difference between the pseudo two-dimensional image 103 and the normal two-dimensional image 111 for the first region of interest $111_1$ and using the difference between the pseudo two-dimensional image 103 and the composite two-dimensional image 121 for the second region of interest $111_2$.

In addition, in the above-described Expression (5), the other region $111_3$ is not used to calculate the loss function. However, the other region $111_3$ may also be used to calculate the loss function. That is, the loss function calculation unit 85 may calculate the loss function on the basis of a value obtained by adding a value, which is obtained by multiplying the difference between the pseudo two-dimensional image 103 and the normal two-dimensional image 111 or the difference between the pseudo two-dimensional image 103 and the composite two-dimensional image 121 by the weight $W111_3$, to the above-described Expression (5) for the other region $111_3$.

Further, FIG. 18 illustrates an aspect in which the region-of-interest detection unit 82 detects each region of interest from the normal two-dimensional image 111 using the region-of-interest detector 68. However, the radiographic image from which each region of interest is detected is not limited to the normal two-dimensional image 111. For example, the region-of-interest detection unit 82 may detect each region of interest from the composite two-dimensional image 121 using the region-of-interest detector 68. In addition, for example, the region-of-interest detection unit 82 may detect the first region of interest $111_1$ from the normal two-dimensional image 111 using the region-of-interest detector 68 and detect the second region of interest $111_2$ from the composite two-dimensional image 121 using the region-of-interest detector 68.

As described above, according to this modification example, the weight for the network of the image generation model 66 is updated according to the loss function based on the difference between the normal two-dimensional image 11 and the pseudo two-dimensional image 103 and the difference between the composite two-dimensional image 121 and the pseudo two-dimensional image 103. Therefore, the loss function is calculated using the radiographic image that is easy to see, according to each of the calcification P1 and the other lesion P2, such as a tumor, and the weight for the network of the image generation model 66 is updated. As a result, it is possible to improve the accuracy of the image generation model 66.

Modification Example 8: Modification Example of Operation Phase

In the generation of the image in the image generation model 66, the amount of processing is larger, and a so-called calculation cost tends to increase. Therefore, the image processing device 16 may generate only the region in which the calcification P1 and the other lesion P2 have been detected, using the image generation model 66. In addition, the image processing device 16 according to this modification example is an example of an image generation device according to the present disclosure.

Figure 19:
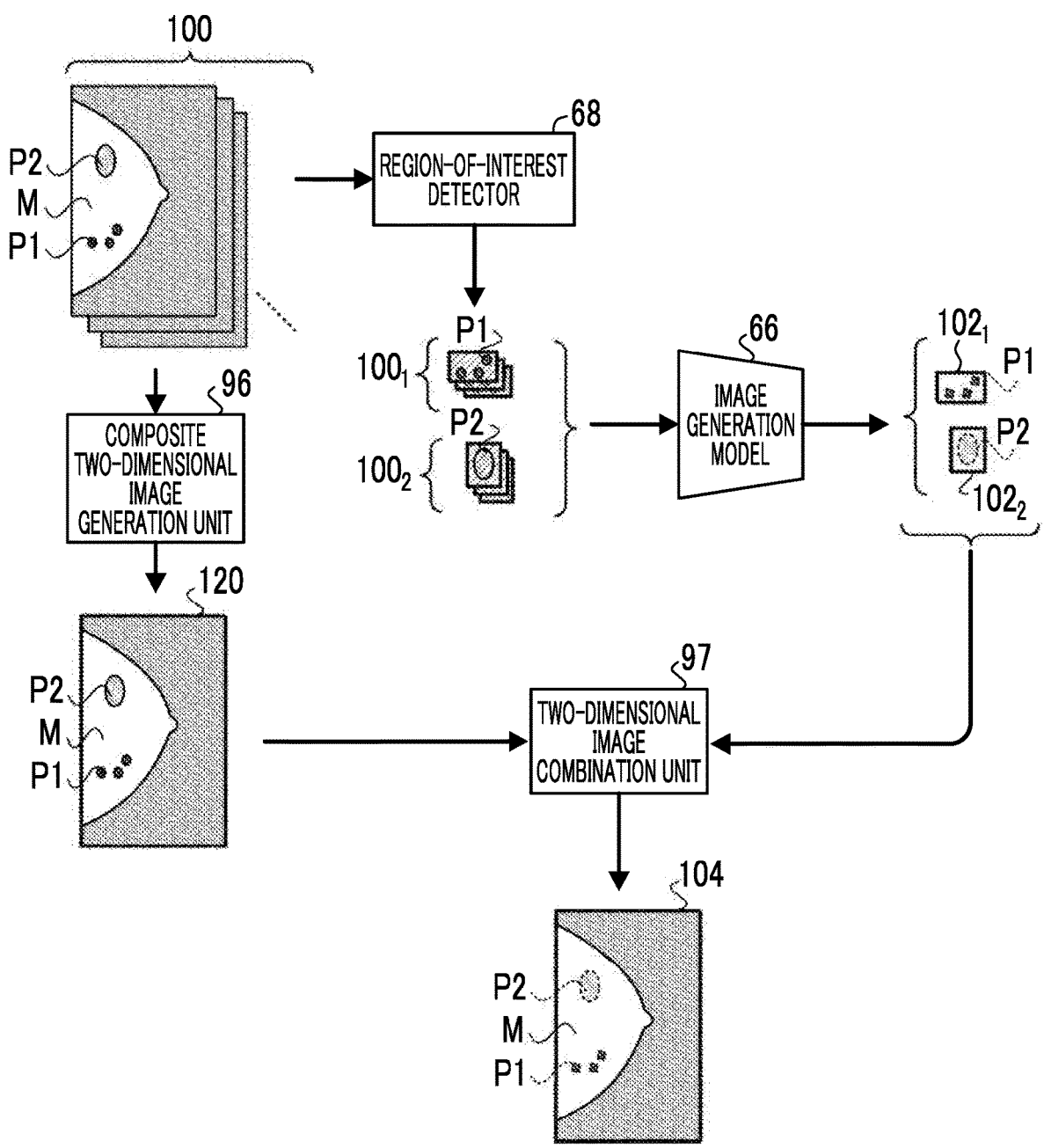
FIG. 19 is a schematic diagram illustrating an outline of a flow of the generation of a pseudo two-dimensional image using an image generation model in an image processing device according to Modification Example 8.

FIG. 19 is a schematic diagram illustrating the outline of the flow of the generation of a pseudo two-dimensional image 104 using the image generation model 66 of the image processing device 16 according to this modification example. As illustrated in FIG. 19, the image processing device 16 detects a first region of interest 1001 and a second region of interest 1002 from a plurality of tomographic images 100, using the region-of-interest detector 68. In addition, the first region of interest 1001 is obtained by cutting out a region, in which the calcification P1 has been detected, as a voxel, and the second region of interest 1002 is obtained by cutting out a region, in which the other lesion P2 has been detected, as a voxel. A plurality of first regions of interest 1001 and a plurality of second regions of interest 1002 are input to the image generation model 66. The image generation model 66 outputs a pseudo two-dimensional image 1021 including the calcification P1 which has been generated according to the input plurality of first regions of interest 1001. Further, the image generation model 66 outputs a pseudo two-dimensional image 1022 including the other lesion P2 which has been generated according to the input plurality of second regions of interest 1002.

Meanwhile, as illustrated in FIG. 19, a composite two-dimensional image generation unit 96 combines the plurality of tomographic images 100 to generate a composite two-dimensional image 120. In addition, a method for generating the composite two-dimensional image 120 is not particularly limited as described in Modification Example 2. For example, the plurality of tomographic images 100 may be combined by an addition method, an averaging method, a maximum intensity projection method, a minimum intensity projection method, or the like to generate a composite two-dimensional image.

Further, as illustrated in FIG. 19, in the image processing device 16, a two-dimensional image combination unit 97 combines the composite two-dimensional image 120 with the pseudo two-dimensional image 1021 and the pseudo two-dimensional image 1022 to generate the pseudo two-dimensional image 104. In addition, the method by which the two-dimensional image combination unit 97 combines the pseudo two-dimensional image 1021 and the pseudo two-dimensional image 1022 is not particularly limited. For example, the pseudo two-dimensional image 1021 and the pseudo two-dimensional image 1022 may be superimposed at the positions corresponding to each of the pseudo two-dimensional image 1021 and the pseudo two-dimensional image 1022 in the composite two-dimensional image 120 to combine the pseudo two-dimensional image 1021 and the pseudo two-dimensional image 1022.

Figure 20:
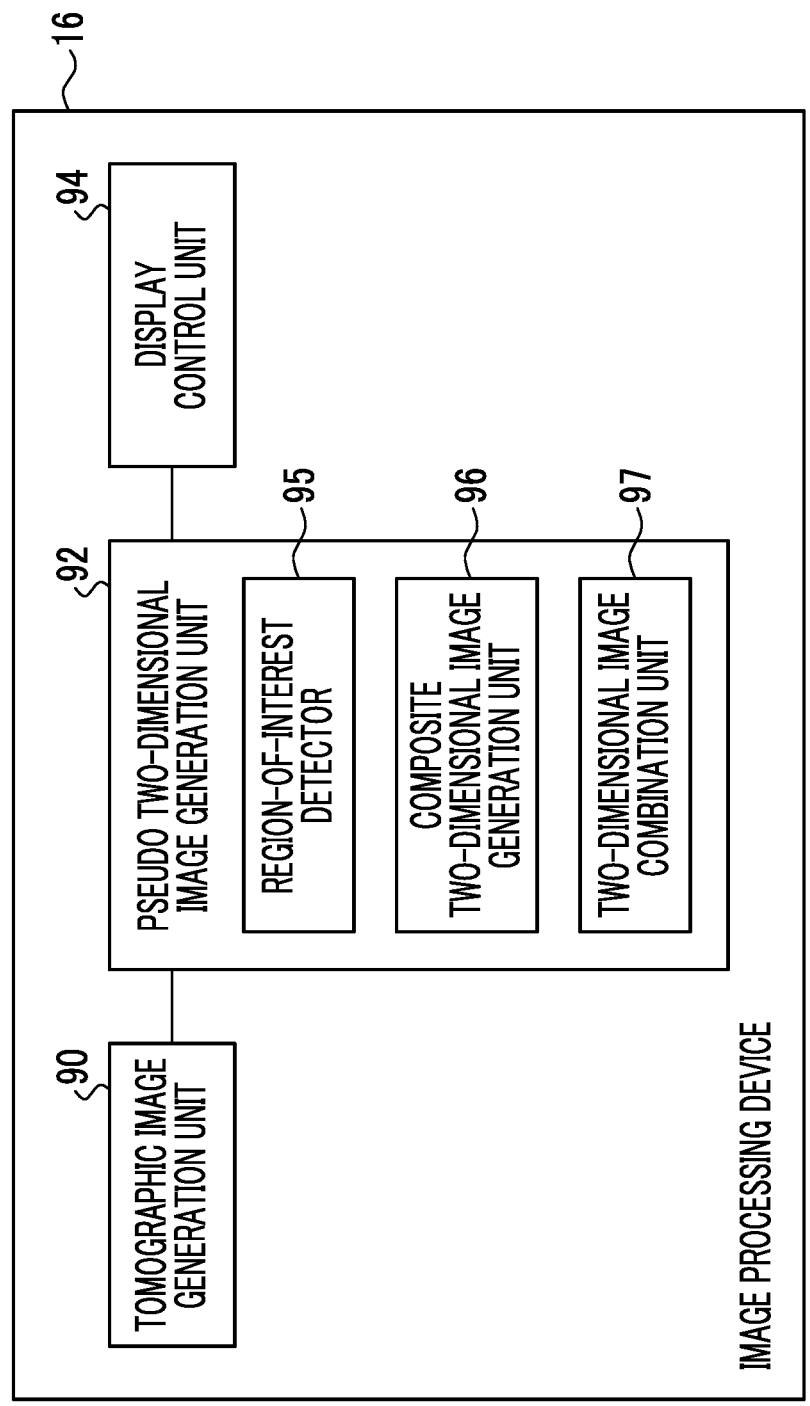
FIG. 20 is a functional block diagram illustrating an example of a configuration related to a function of generating the pseudo two-dimensional image in the image processing device according to Modification Example 8.

FIG. 20 is a functional block diagram illustrating an example of a configuration related to a function of generating the pseudo two-dimensional image 102 in the image processing device 16 according to this modification example. As illustrated in FIG. 20, the image processing device 16 according to this modification example differs from the image processing device 16 (see FIG. 10) according to the above-described embodiment in the configuration of the pseudo two-dimensional image generation unit 92. The pseudo two-dimensional image generation unit 92 according to this modification example includes a region-of-interest detection unit 95, the composite two-dimensional image generation unit 96, and the two-dimensional image combination unit 97.

The image generation program 63B according to this modification example is an example of an image generation program according to the present disclosure. In the image processing device 16, the CPU 60A of the control unit 60 executes the image generation program 63B stored in the storage unit 62 to function as the tomographic image generation unit 90, the pseudo two-dimensional image generation unit 92, and the display control unit 94.

Since the tomographic image generation unit 90 and the display control unit 94 are the same as the tomographic image generation unit 90 and the display control unit 94 (see FIG. 10) of the image processing device 16 according to the above-described embodiment, the description thereof will not be repeated. Meanwhile, as described above, the region-of-interest detection unit 95 of the pseudo two-dimensional image generation unit 92 has a function of detecting the first region of interest 1001 and the second region of interest 1002 from each of the plurality of tomographic images 100, using the region-of-interest detector 68. The pseudo two-dimensional image generation unit 92 inputs the detected first region of interest 1001 and second region of interest 1002 to the image generation model 66.

The composite two-dimensional image generation unit 96 has a function of combining at least some of the plurality of second tomographic images 100 to generate the composite two-dimensional image 120 as described above.

As described above, the two-dimensional image combination unit 97 has a function of combining the pseudo two-dimensional image 1021 and the pseudo two-dimensional image 1022 output from the image generation model 66 with the composite two-dimensional image 120 to generate the pseudo two-dimensional image 104. The two-dimensional image combination unit 97 outputs the generated pseudo two-dimensional image 104 to the display control unit 94.

Figure 21:
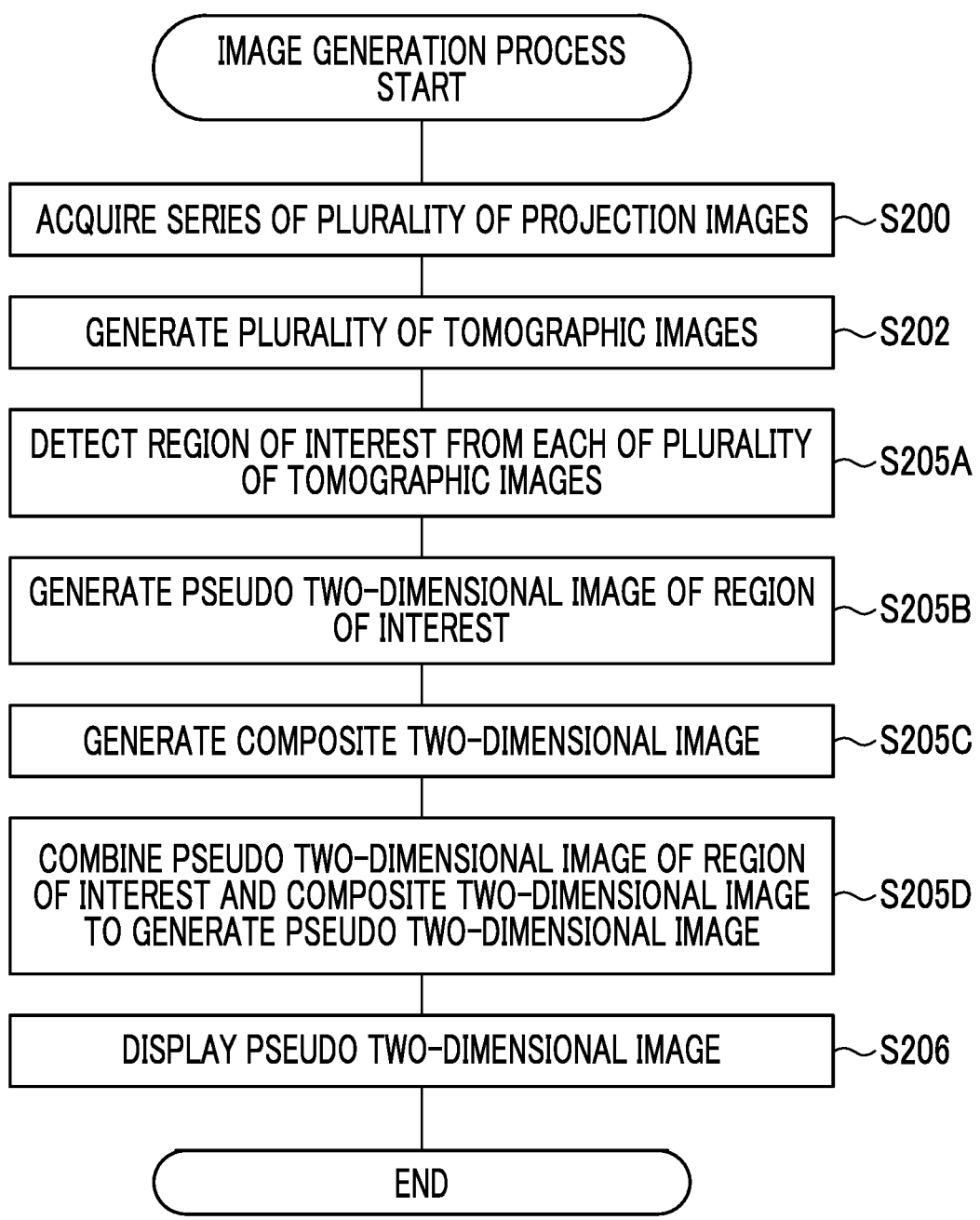
FIG. 21 is a flowchart illustrating an example of a flow of an image generation process by the image processing device according to Modification Example 8.

FIG. 21 is a flowchart illustrating an example of the flow of an image generation process by the image processing device 16 according to this modification example. The image generation process illustrated in FIG. 21 is different from the image generation process (see FIG. 11) according to the above-described embodiment in that it comprises Steps S205A to 5205D instead of Step S204.

As illustrated in FIG. 21, in Step S205A, the pseudo two-dimensional image generation unit 92 detects the first region of interest 1001 and the second region of interest 1002 from each of the plurality of tomographic images 100 as described above.

Then, in Step S205B, the pseudo two-dimensional image generation unit 92 generates the pseudo two-dimensional image 1021 and the pseudo two-dimensional image 1022 of the first region of interest 1001 and the second region of interest 1002 detected in Step S205A, using the image generation model 66 as described above.

Then, in Step S205C, the composite two-dimensional image generation unit 96 combines at least some of the plurality of tomographic images 100 to generate the composite two-dimensional image 120 as described above.

Then, in Step S205D, the two-dimensional image combination unit 97 combines the pseudo two-dimensional image 1021 and the pseudo two-dimensional image 1022 generated in Step S205B with the composite two-dimensional image 120 generated in Step S205C to generate the pseudo two-dimensional image 104 as described above.

As described above, in this modification example, the pseudo two-dimensional image is generated only for the region of interest using the image generation model 66. Therefore, it is possible to reduce the amount of processing in the image generation model 66, as compared to a case in which a pseudo two-dimensional image is also generated for other regions using the image generation model 66. As a result, it is possible to suppress an increase in so-called calculation cost.

Further, the image processing device 16 may select whether to generate a pseudo two-dimensional image only for the region of interest using the image generation model 66 as in this modification example or to generate the entire pseudo two-dimensional image including other regions in response to an instruction from, for example, a doctor, or automatically. For example, in a case in which the number of regions of interest is relatively small or in a case in which the total area of all of the regions of interest is relatively small as compared to the entire image, the image processing device 16 may be configured to select to generate a pseudo two-dimensional image for only the regions of interest.

As described above, the image processing device 16 according to the above-described embodiment is a device for training the image generation model 66 that generates the pseudo two-dimensional image 102 from a series of a plurality of projection images obtained by performing the tomosynthesis imaging on the breast or a plurality of tomographic images 100 obtained from a series of a plurality of projection images. The image processing device 16 comprises the CPU 60A. The CPU 60A acquires the normal two-dimensional image 111 captured by irradiating the breast with radiation and detects the first region of interest $111_1$ including the calcification P1 of the breast and the second region of interest $111_2$ including the other lesion P2, which is a lesion other than the calcification P1, on the basis of any one of the composite two-dimensional image obtained by combining at least some of a series of plurality of projection images or a plurality of tomographic images 101, the tomographic image 100, and the normal two-dimensional image 111. The CPU 60A trains the image generation model 66 by updating the weight for the network of the image generation model 66 on the basis of the loss function between the normal two-dimensional image 111 and the pseudo two-dimensional image 103 generated by the image generation model 66, in which the weight $W111_1$ for the first region of interest $111_1$ is the largest and the weight $W111_2$ for the second region of interest $111_2$ is set to be equal to or larger than the weight $W111_3$ for the other region $111_3$ other than the first region of interest $W111_1$ and the second region of interest $111_2$, to reduce the loss function.

As described above, in the above-described embodiment, the image generation model 66 is trained while the weight for the calcification P1 is set to be larger than the weight for the other region and the weight for the network is updated. Therefore, it is possible to perform training with more focus on the calcification P1 than on the other region. As a result, it is possible to further improve the reproducibility of the calcification P1. The calcification tends to be smaller than other lesions and has a fine shape. Therefore, according to the image processing device 16 of the above-described embodiment, it is possible to generate a pseudo two-dimensional image in which the shape of the lesion of the breast has been accurately reproduced.

Further, in the above-described embodiment, the aspect in which a CAD algorithm based on the probability of being the calcification P1 and the other lesion P2 is applied to the region-of-interest detector 68 to detect the calcification P1 and the other lesion P2 has been described. However, the aspect in which the region-of-interest detector 68 detects the calcification P1 and the other lesion P2 is not limited to this aspect. For example, the calcification P1 and the other lesion P2 may be detected by a filtering process using a filter for detecting each of the calcification P1 and the other lesion P2, a detection model that has been subjected to machine learning by deep learning so as to detect each of the calcification P1 and the other lesion P2, and the like.

Further, for example, it is considered that U-Net which is an encoder-decoder model using a convolutional neural network (CNN) is applied as the image generation model 66 as described above. In this case, it is assumed that only an encoder unit performs three-dimensional convolution. In addition, for example, a multilayer perceptron (MLP) may be applied.

In addition, in the above-described embodiment, the aspect has been described in which the image processing device 16 trains the image generation model 66 and generates the pseudo two-dimensional image using the image generation model 66. However, a learning device other than the image processing device 16 may train the image generation model 66. That is, the device for training the image generation model 66 and the device for generating the pseudo two-dimensional image 102 using the image generation model 66 may be different from each other.

Further, in the above-described embodiment, for example, the following various processors can be used as a hardware structure of processing units performing various processes, such as the training data acquisition unit 80, the region-of-interest detection unit 82, the image generation model generation unit 84, the tomographic image generation unit 90, the pseudo two-dimensional image generation unit 92, and the display control unit 94. The various processors include, for example, a programmable logic device (PLD), such as a field programmable gate array (FPGA), that is a processor whose circuit configuration can be changed after manufacture, and a dedicated electric circuit, such as an application specific integrated circuit (ASIC), that is a processor having a dedicated circuit configuration designed to perform a specific process, in addition to the CPU that is a general-purpose processor which executes software (programs) to function as various processing units as described above.

One processing unit may be configured by one of the various processors or a combination of two or more processors of the same type or different types (for example, a combination of a plurality of FPGAs or a combination of a CPU and an FPGA). Further, a plurality of processing units may be configured by one processor.

A first example of the configuration in which a plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured using one or more of the various processors as a hardware structure.

In addition, specifically, an electric circuit (circuitry) obtained by combining circuit elements, such as semiconductor elements, can be used as the hardware structure of the various processors.

Further, in the above-described embodiment, the aspect in which the learning program 63A and the image generation program 63B are stored (installed) in the storage unit 62 in advance has been described. However, the present disclosure is not limited thereto. Each of the learning program 63A and the image generation program 63B may be recorded on a recording medium, such as a compact disc read only memory (CD-ROM), a digital versatile disc read only memory (DVD-ROM), or a universal serial bus (USB) memory, and then be provided. Furthermore, each of the learning program 63A and the image generation program 63B may be downloaded from an external device through the network.

What is claimed is:

1. A learning device for an image generation model that generates a pseudo two-dimensional image from a series of a plurality of projection images obtained by performing tomosynthesis imaging on a breast or from a plurality of tomographic images obtained from the series of the plurality of projection images, the learning device comprising:
  at least one processor,
  wherein the processor acquires a normal two-dimensional image captured by irradiating the breast with radiation, detects a first region of interest including a calcification of the breast and a second region of interest including a lesion other than the calcification on the basis of any one of a composite two-dimensional image obtained by combining at least some of the series of the plurality of projection images or the plurality of tomographic images, the tomographic image, or the normal two-dimensional image, and trains the image generation model, in which a weight for the first region of interest is largest and a weight for the second region of interest is set to be equal to or larger than a weight for a region other than the first region of interest and the second region of interest, by updating a weight for a network of the image generation model on the basis of a loss between the pseudo two-dimensional image output by the image generation model and the normal two-dimensional image and/or the composite two-dimensional image to reduce the loss, and wherein the processor detects the first region of interest from the normal two-dimensional image or from the composite two-dimensional image and detects the second region of interest from the tomographic image.

2. The learning device according to claim 1, wherein the processor makes the weight for the network to be updated different depending on a type of the other lesion.

3. The learning device according to claim 1, wherein the processor derives a mammary gland volume of the breast from the normal two-dimensional image and adjusts at least one of the weight for the first region of interest, the weight for the second region of interest, or a weight for a third region of interest according to the derived mammary gland volume.

4. The learning device according to claim 1, wherein the processor corrects a positional deviation between the series of the plurality of projection images or the plurality of tomographic images and the normal two-dimensional image and inputs the corrected series of the plurality of projection images or the corrected plurality of tomographic images to the image generation model to train the image generation model.

5. An image generation device that generates a pseudo two-dimensional image using an image generation model trained by the learning device according to claim 1, the image generation device comprising:

at least one processor, wherein the processor acquires a series of a plurality of projection images obtained by performing tomosynthesis imaging on a breast or a plurality of tomographic images obtained from the series of the plurality of projection images as images for generating the pseudo two-dimensional image, combines at least some of the images for generating the pseudo two-dimensional image to generate a composite two-dimensional image, detects a region of interest including a lesion from the images for generating the pseudo two-dimensional image or from the composite two-dimensional image, inputs an image of the region of interest to the image generation model and acquires a pseudo two-dimensional image of the region of interest output from the image generation model, and combines the composite two-dimensional image and the pseudo two-dimensional image of the region of interest to generate a pseudo two-dimensional image.

6. A learning method that is executed by a computer and that is for an image generation model that generates a pseudo two-dimensional image from a series of a plurality of projection images obtained by performing tomosynthesis imaging on a breast or from a plurality of tomographic images obtained from the series of the plurality of projection images, the learning method comprising:

acquiring a normal two-dimensional image captured by irradiating the breast with radiation;

detecting a first region of interest including a calcification of the breast and a second region of interest including a lesion other than the calcification on the basis of any one of a composite two-dimensional image obtained by combining at least some of the series of the plurality of projection images or the plurality of tomographic images, the tomographic image, or the normal two-dimensional image; and training the image generation model, in which a weight for the first region of interest is largest and a weight for the second region of interest is set to be equal to or larger than a weight for a region other than the first region of interest and the second region of interest, by updating a weight for a network of the image generation model on the basis of a loss between the pseudo two-dimensional image output by the image generation model and the normal two-dimensional image and/or the composite two-dimensional image to reduce the loss, wherein the first region of interest is detected from the normal two-dimensional image or from the composite two-dimensional image and the second region of interest is detected from the tomographic image.

7. An image generation method that is executed by a computer and that generates a pseudo two-dimensional image using an image generation model trained by the learning device according to claim 1, the image generation method comprising:

acquiring a series of a plurality of projection images obtained by performing tomosynthesis imaging on a breast or a plurality of tomographic images obtained from the series of the plurality of projection images as images for generating the pseudo two-dimensional image;

combining at least some of the images for generating the pseudo two-dimensional image to generate a composite two-dimensional image;

detecting a region of interest including a lesion from the images for generating the pseudo two-dimensional image or from the composite two-dimensional image;

inputting an image of the region of interest to the image generation model and acquiring a pseudo two-dimensional image of the region of interest output from the image generation model; and combining the composite two-dimensional image and the pseudo two-dimensional image of the region of interest to generate a pseudo two-dimensional image.

8. A non-transitory computer-readable storage medium storing a learning program that causes a computer to execute a process of training an image generation model that generates a pseudo two-dimensional image from a series of a plurality of projection images obtained by performing tomosynthesis imaging on a breast or from a plurality of tomographic images obtained from the series of the plurality of projection images, the learning program causing the computer to execute:

acquiring a normal two-dimensional image captured by irradiating the breast with radiation;

detecting a first region of interest including a calcification of the breast and a second region of interest including a lesion other than the calcification on the basis of any one of a composite two-dimensional image obtained by combining at least some of the series of the plurality of projection images or the plurality of tomographic images, the tomographic image, or the normal two-dimensional image; and training the image generation model, in which a weight for the first region of interest is largest and a weight for the second region of interest is set to be equal to or larger than a weight for a region other than the first region of interest and the second region of interest, by updating a weight for a network of the image generation model on the basis of a loss between the pseudo two-dimensional image output by the image generation model and the normal two-dimensional image and/or the composite two-dimensional image to reduce the loss, wherein the first region of interest is detected from the normal two-dimensional image or from the composite two-dimensional image and the second region of interest is detected from the tomographic image.

9. A non-transitory computer-readable storage medium storing an image generation program that causes a computer to execute a process of generating a pseudo two-dimensional image using an image generation model trained by the learning device according to claim 1, the image generation program causing the computer to execute:

acquiring a series of a plurality of projection images obtained by performing tomosynthesis imaging on a breast or a plurality of tomographic images obtained from the series of the plurality of projection images as images for generating the pseudo two-dimensional image;

combining at least some of the images for generating the pseudo two-dimensional image to generate a composite two-dimensional image;

detecting a region of interest including a lesion from the images for generating the pseudo two-dimensional image or from the composite two-dimensional image;

inputting an image of the region of interest to the image generation model and acquiring a pseudo two-dimensional image of the region of interest output from the image generation model; and combining the composite two-dimensional image and the pseudo two-dimensional image of the region of interest to generate a pseudo two-dimensional image.

* * * * *